(12) United States Patent
Munro

(10) Patent No.: US 11,598,849 B2
(45) Date of Patent: Mar. 7, 2023

(54) SIGNAL GENERATING SYSTEMS FOR THREE-DIMENSIONAL IMAGING SYSTEMS AND METHODS THEREOF

(71) Applicant: Munro Design & Technologies, LLC, Ontario, NY (US)

(72) Inventor: James F. Munro, Ontario, NY (US)

(73) Assignee: MUNRO DESIGN & TECHNOLOGIES, LLC, Ontario, NY (US)

( * ) Notice: Subject to any disclaimer, the term of this patent is extended or adjusted under 35 U.S.C. 154(b) by 782 days.

(21) Appl. No.: 16/208,192

(22) Filed: Dec. 3, 2018

(65) Prior Publication Data
US 2019/0174123 A1   Jun. 6, 2019

Related U.S. Application Data

(60) Provisional application No. 62/593,970, filed on Dec. 3, 2017, provisional application No. 62/643,014, filed
(Continued)

(51) Int. Cl.
*G01S 7/481* (2006.01)
*G01S 17/36* (2006.01)
(Continued)

(52) U.S. Cl.
CPC ............ *G01S 7/4815* (2013.01); *G01S 7/484* (2013.01); *G01S 7/4816* (2013.01); *G01S 7/497* (2013.01);
(Continued)

(58) Field of Classification Search
CPC ........ G01S 7/4815; G01S 17/18; G01S 7/484; G01S 17/894; G01S 7/497; G01S 7/4911;
(Continued)

(56) References Cited

U.S. PATENT DOCUMENTS 4,935,616 A * 6/1990 Scott ..................... G01S 17/89
356/5.15
6,288,776 B1   9/2001 Cahill et al.
(Continued)

OTHER PUBLICATIONS

International Search Report and Written Opinion for PCT Application No. PCT/US18/63659, dated Feb. 19, 2019.
(Continued)

*Primary Examiner* — Christopher S Kelley
*Assistant Examiner* — Asmamaw G Tarko
(74) *Attorney, Agent, or Firm* — Troutman Pepper Hamilton Sanders LLP (Rochester)

(57) ABSTRACT

Methods and systems for generating illumination modulation signals, image intensifier gain modulation signals, and image sensor shutter control signals in a three-dimensional image-capturing system with one or more frequency synthesizers is disclosed. The illumination modulation signals, image intensifier gain modulation signals, and image sensor shutter signal are all coherent with one another, being derived from a common clock source. The use of frequency synthesizer concepts allow for the use of rapid modulation phase changes for homodyne operation, and further allow the use of rapid modulation frequency changes to mitigate the effects of inter-camera interference.

38 Claims, 6 Drawing Sheets

Related U.S. Application Data on Mar. 14, 2018, provisional application No. 62/667,442, filed on May 5, 2018.

(51) Int. Cl.

| | |
|---|---|
| *H04N 5/238* | (2006.01) |
| *G01S 7/4911* | (2020.01) |
| *G01S 7/497* | (2006.01) |
| *G01S 7/484* | (2006.01) |
| *G01S 17/18* | (2020.01) |
| *G01S 17/34* | (2020.01) |
| *G01S 17/894* | (2020.01) |
| *G06T 7/521* | (2017.01) |
| *G06T 7/55* | (2017.01) |
| *G06T 7/593* | (2017.01) |
| *G06T 7/60* | (2017.01) |
| *G06T 7/586* | (2017.01) |
| *H04N 13/254* | (2018.01) |
| *H04N 13/296* | (2018.01) |
| *H04N 5/235* | (2006.01) |
| *H04N 13/167* | (2018.01) |
| *H04N 13/156* | (2018.01) |
| *G06T 1/20* | (2006.01) |
| *G01S 13/34* | (2006.01) |

(52) U.S. Cl.
CPC ............. *G01S 7/4911* (2013.01); *G01S 17/18* (2020.01); *G01S 17/34* (2020.01); *G01S 17/36* (2013.01); *G01S 17/894* (2020.01); *G06T 1/20* (2013.01); *G06T 7/521* (2017.01); *G06T 7/55* (2017.01); *G06T 7/586* (2017.01); *G06T 7/593* (2017.01); *G06T 7/60* (2013.01); *H04N 5/238* (2013.01); *H04N 5/2352* (2013.01); *H04N 13/156* (2018.05); *H04N 13/167* (2018.05); *H04N 13/254* (2018.05); *H04N 13/296* (2018.05); *G01S 13/342* (2013.01); *G06T 2200/04* (2013.01)

(58) Field of Classification Search
CPC ........ G01S 17/36; G01S 7/4816; G01S 17/34; G01S 13/342; H04N 13/296; H04N 13/167; H04N 13/254; H04N 5/238; H04N 13/156; H04N 5/2352; G06T 1/20; G06T 2200/04; G06T 7/55; G06T 7/60; G06T 7/521; G06T 7/586; G06T 7/593
USPC .......................................................... 356/4
See application file for complete search history.

(56) References Cited

U.S. PATENT DOCUMENTS

| | | | |
|---|---|---|---|
| 6,584,283 | B2 | 6/2003 | Gabello et al. |
| 6,707,054 | B2 | 3/2004 | Ray |
| 6,856,382 | B2 | 2/2005 | Cahill et al. |
| 6,925,195 | B2 | 8/2005 | Cahill et al. |
| 6,950,135 | B2 | 9/2005 | Mckee et al. |
| 7,684,019 | B2 * | 3/2010 | Bonnet .................. H01S 3/083 |
| | | | 356/28 |
| 8,254,665 | B2 | 8/2012 | Munro |
| 9,977,128 | B2 * | 5/2018 | Oberhammer .......... G01S 7/487 |
| 11,029,147 | B2 * | 6/2021 | Abovitz ................ A63F 13/213 |
| 2002/0195547 | A1 * | 12/2002 | Ostromek ............. H04N 5/238 |
| | | | 348/E5.04 |
| 2003/0053513 | A1 * | 3/2003 | Vatan ................. G06K 7/10594 |
| | | | 372/109 |
| 2005/0018170 | A1 * | 1/2005 | Fujimori ................ G01S 17/36 |
| | | | 356/4.01 |
| 2006/0062260 | A1 * | 3/2006 | Marron ............. G01B 9/02057 |
| | | | 372/20 |
| 2008/0050013 | A1 * | 2/2008 | Munro .................... G01S 17/87 |
| | | | 382/154 |
| 2008/0304039 | A1 * | 12/2008 | De Coi .................... G01V 8/20 |
| | | | 356/4.1 |
| 2008/0304044 | A1 * | 12/2008 | Cooper .................. G01S 13/89 |
| | | | 356/5.15 |
| 2009/0079955 | A1 * | 3/2009 | Tsunesada ........... H04N 5/2354 |
| | | | 356/4.01 |
| 2010/0191418 | A1 * | 7/2010 | Mimeault .............. H05B 45/10 |
| | | | 356/4.01 |
| 2011/0006190 | A1 * | 1/2011 | Alameh .................. G01S 7/484 |
| | | | 250/206.1 |
| 2011/0299059 | A1 * | 12/2011 | Buettgen ............... G01S 7/4815 |
| | | | 315/250 |
| 2011/0304498 | A1 * | 12/2011 | Yanagihara ............. G01S 7/414 |
| | | | 342/70 |
| 2012/0069176 | A1 * | 3/2012 | Park ...................... G01S 7/4912 |
| | | | 348/135 |
| 2012/0223847 | A1 * | 9/2012 | Mazumdar ............. H03M 9/00 |
| | | | 341/100 |
| 2013/0280798 | A1 * | 10/2013 | Takesue ................. G01N 22/00 |
| | | | 435/287.1 |
| 2013/0301909 | A1 * | 11/2013 | Sato ...................... G03H 1/0443 |
| | | | 382/154 |
| 2014/0055565 | A1 * | 2/2014 | You ...................... H04N 13/257 |
| | | | 348/46 |
| 2014/0152974 | A1 * | 6/2014 | Ko ........................ G01S 17/894 |
| | | | 356/5.01 |
| 2014/0152975 | A1 * | 6/2014 | Ko ........................ G01S 17/894 |
| | | | 356/5.01 |
| 2014/0300701 | A1 * | 10/2014 | Park ...................... H04N 13/271 |
| | | | 348/46 |
| 2015/0015432 | A1 * | 1/2015 | Chang ..................... G01S 7/032 |
| | | | 342/22 |
| 2017/0343670 | A1 * | 11/2017 | Matthews ............. G01S 17/931 |
| 2019/0174123 | A1 * | 6/2019 | Munro ...................... G06T 1/20 |
| 2019/0179017 | A1 * | 6/2019 | Nagai ...................... G01C 3/06 |
| 2019/0383946 | A1 * | 12/2019 | Namba ................. G01S 7/4868 |
| 2021/0138232 | A1 * | 5/2021 | Paz ..................... A61N 1/36031 |
| 2021/0156999 | A1 * | 5/2021 | Nishino .................. G01S 7/481 |

OTHER PUBLICATIONS

"Heterodyne", Nov. 13, 2018, 4 pages, Wikipedia, Retrieved from the Internet: <https://en.wikipedia.org/wiki/Heterodyne>.
"Frequency Synthesizer", Oct. 25, 2018, 6 pages, Wikipedia, Retrieved from the Internet: <https://en.wikipedia.org/wiki/Frequency_synthesizer>.

* cited by examiner

| Column 1 | Column 2 | Column 3 | Column 4 | Column 5 | Column 6 | Coulmn 7 | Column 8 | Column 9 | Column 10 | Column 11 |
|---|---|---|---|---|---|---|---|---|---|---|
| Digital Camera Frames / Sec | $f_{FS}$ | $f_{FS}$ / Frame Rate (degrees) | DFT Pts Per Cycle of $f_{FS}$ | Seconds per 3D Frame | 3D Frames / Sec | Shutter division exponent K | $TW_{illum}$ | $f_{illum}$ | $TW_{MCP}$ | $f_{MCP}$ |
| 8 | 1 | 45 | 8 | 1.000 | 1.0 | 24 | 800,000,000 | 25,000,000 | 800,000,032 | 25,000,001 |
| 16 | 1 | 22.5 | 16 | 1.000 | 1.0 | 23 | 800,000,000 | 25,000,000 | 800,000,032 | 25,000,001 |
| 32 | 1 | 11.25 | 32 | 1.000 | 1.0 | 22 | 800,000,000 | 25,000,000 | 800,000,032 | 25,000,001 |
| 8 | 2 | 90 | 4 | 0.500 | 2.0 | 24 | 800,000,000 | 25,000,000 | 800,000,064 | 25,000,002 |
| 16 | 2 | 45 | 8 | 0.500 | 2.0 | 23 | 800,000,000 | 25,000,000 | 800,000,064 | 25,000,002 |
| 32 | 2 | 22.5 | 16 | 0.500 | 2.0 | 22 | 800,000,000 | 25,000,000 | 800,000,064 | 25,000,002 |
| 64 | 2 | 11.25 | 32 | 0.500 | 2.0 | 21 | 800,000,000 | 25,000,000 | 800,000,064 | 25,000,002 |
| 16 | 4 | 90 | 4 | 0.250 | 4.0 | 23 | 800,000,000 | 25,000,000 | 800,000,128 | 25,000,004 |
| 32 | 4 | 45 | 8 | 0.250 | 4.0 | 22 | 800,000,000 | 25,000,000 | 800,000,128 | 25,000,004 |
| 64 | 4 | 22.5 | 16 | 0.250 | 4.0 | 21 | 800,000,000 | 25,000,000 | 800,000,128 | 25,000,004 |
| 128 | 4 | 11.25 | 32 | 0.250 | 4.0 | 20 | 800,000,000 | 25,000,000 | 800,000,128 | 25,000,004 |
| 32 | 8 | 90 | 4 | 0.125 | 8.0 | 22 | 800,000,000 | 25,000,000 | 800,000,256 | 25,000,008 |
| 64 | 8 | 45 | 8 | 0.125 | 8.0 | 21 | 800,000,000 | 25,000,000 | 800,000,256 | 25,000,008 |
| 128 | 8 | 22.5 | 16 | 0.125 | 8.0 | 20 | 800,000,000 | 25,000,000 | 800,000,256 | 25,000,008 |
| 256 | 8 | 11.25 | 32 | 0.125 | 8.0 | 19 | 800,000,000 | 25,000,000 | 800,000,256 | 25,000,008 |
| 64 | 16 | 90 | 4 | 0.063 | 16.0 | 21 | 800,000,000 | 25,000,000 | 800,000,512 | 25,000,016 |
| 128 | 16 | 45 | 8 | 0.063 | 16.0 | 20 | 800,000,000 | 25,000,000 | 800,000,512 | 25,000,016 |
| 256 | 16 | 22.5 | 16 | 0.063 | 16.0 | 19 | 800,000,000 | 25,000,000 | 800,000,512 | 25,000,016 |
| 512 | 16 | 11.25 | 32 | 0.063 | 16.0 | 18 | 800,000,000 | 25,000,000 | 800,000,512 | 25,000,016 |
| 128 | 32 | 90 | 4 | 0.031 | 32.0 | 20 | 800,000,000 | 25,000,000 | 800,001,024 | 25,000,032 |
| 256 | 32 | 45 | 8 | 0.031 | 32.0 | 19 | 800,000,000 | 25,000,000 | 800,001,024 | 25,000,032 |
| 512 | 32 | 22.5 | 16 | 0.031 | 32.0 | 18 | 800,000,000 | 25,000,000 | 800,001,024 | 25,000,032 |
| 1024 | 32 | 11.25 | 32 | 0.031 | 32.0 | 17 | 800,000,000 | 25,000,000 | 800,001,024 | 25,000,032 |
| 256 | 64 | 90 | 4 | 0.016 | 64.0 | 19 | 800,000,000 | 25,000,000 | 800,002,048 | 25,000,064 |
| 512 | 64 | 45 | 8 | 0.016 | 64.0 | 18 | 800,000,000 | 25,000,000 | 800,002,048 | 25,000,064 |
| 1024 | 64 | 22.5 | 16 | 0.016 | 64.0 | 17 | 800,000,000 | 25,000,000 | 800,002,048 | 25,000,064 |
| 2048 | 64 | 11.25 | 32 | 0.016 | 64.0 | 16 | 800,000,000 | 25,000,000 | 800,002,048 | 25,000,064 |
| 512 | 128 | 90 | 4 | 0.008 | 128.0 | 18 | 800,000,000 | 25,000,000 | 800,004,096 | 25,000,128 |
| 1024 | 128 | 45 | 8 | 0.008 | 128.0 | 17 | 800,000,000 | 25,000,000 | 800,004,096 | 25,000,128 |
| 2048 | 128 | 22.5 | 16 | 0.008 | 128.0 | 16 | 800,000,000 | 25,000,000 | 800,004,096 | 25,000,128 |
| 4096 | 128 | 11.25 | 32 | 0.008 | 128.0 | 15 | 800,000,000 | 25,000,000 | 800,004,096 | 25,000,128 |

Figure 3

SIGNAL GENERATING SYSTEMS FOR THREE-DIMENSIONAL IMAGING SYSTEMS AND METHODS THEREOF

This application claims the benefit of U.S. Provisional Patent Application Ser. No. 62/593,970, filed Dec. 3, 2017, U.S. Provisional Patent Application Ser. No. 62/643,014, filed Mar. 14, 2018, and U.S. Provisional Patent Application Ser. No. 62/667,442, filed May 5, 2018, which are all hereby incorporated by reference in their entirety.

FIELD

This technology generally relates to systems and methods for three-dimensional imaging and, more particularly, to systems and methods for high-resolution, high-accuracy, three-dimensional imaging of a three-dimensional scene at video frame rates.

BACKGROUND

The state of the art in three-dimensional image-capturing technology has improved significantly in recent years, to the point where Super Video Graphics Array (SVGA) resolution, millimeter distance accuracy, and video frame rates can all be readily achieved when capturing three dimensional (3D) images of target scenes several meters away from the imager. Additionally, 3D imagers are becoming more ubiquitous, and the emissions from one 3D imager can often interfere and corrupt the 3D imaging process of a neighboring 3D imager that is attempting to capture 3D imagery of the same target or scene.

One reason the emissions from one 3D imager can interfere and corrupt the 3D imaging process of a neighboring 3D imager is because the modulation frequencies of the light emitted by each 3D imager is substantially the same and is worsened by the fact that means are not provided for changing the modulation frequency to an arbitrary frequency as the need arises. Indeed, as noted in U.S. Pat. No. 4,935,616 beginning at column 2, line 63, "A sinusoidal source 20 is connected through switch 22 to cw laser 14 and modulates the beam thereof with an amplitude varying sinusoidal modulation 24. A second source of modulating signals 26 is connected through switch 28 to cw laser 14 and provides a different sinusoidal modulating frequency which is particularly useful in a second embodiment of this technology. The frequency of source 20 may characteristically be approximately 75 MHz, whereas the frequency of source 26 may be 82.5 MHz." Accordingly, with this design two frequency sources (with a switch 28) are required to obtain two frequencies, which generally will be more expensive to implement than a single frequency source that can generate multiple frequencies. Additionally, with this design only two frequencies are implemented, which is an insufficient number to guarantee that a neighboring 3D imager can identify and utilize a non-offending modulation frequency to eliminate the interference and 3D imaging process corruption. Further, with this design the frequency switching process with the switch must be fast to minimize the amount of time in which the 3D imaging process is not executing due to the amount of time it takes to switch between frequencies which is not always possible.

SUMMARY

A three-dimensional imaging system includes a plurality of frequency generators, a light emission system, an image capture system, and an image processing computing device. Each of the plurality of frequency generators is adjustable to generate one of a plurality of modulation frequencies. The light emission system is configured to be modulated with the one of the modulation frequencies adjustably generated by one of the plurality of generators and to output light used to illuminate a target. The image capture system is configured to be modulated by another one of the modulation frequencies adjustably generated by another one of the frequency generators to capture reflected light from the light that illuminates the target. The image processing computing device is coupled to an output of the image capture system to generate a three-dimensional image of the target based on the captured reflected light.

A method for making a three-dimensional imaging system includes providing a plurality of frequency generators. Each of the plurality of frequency generators is adjustable to generate one of a plurality of modulation frequencies. A light emission system is coupled to be modulated with the one of the modulation frequencies adjustably generated by one of the plurality of generators and to output light used to illuminate a target. An image capture system is positioned to capture reflected light from the light that illuminates the target and is coupled to be modulated by another one of the modulation frequencies adjustably generated by another one of the frequency generators. The image processing computing device is coupled to an output of the image capture system to generate a three-dimensional image of the target based on the captured reflected light.

A three-dimensional imaging system includes an image intensification subsystem whose gain is modulated at a first frequency, as well as a light emission subsystem whose output is used to illuminate a target with modulated light having a second frequency, in which both frequencies are generated from a common frequency source with frequency synthesizers or generators whose frequency can be rapidly changed as needed. The frequency synthesis can be implemented with Direct Digital Synthesizer (DDS) circuits or phase-locked-loop (PLL) circuits.

A three-dimensional imaging system includes an image intensification subsystem whose gain is modulated at a frequency having a first phase, as well as a light emission subsystem whose output is used to illuminate a target with modulated light at the same frequency but having a second phase, in which the frequency and phases are generated from a common frequency source with frequency synthesizers or generators whose frequency and phase can be rapidly changed as needed. The frequency and phase synthesis can be implemented with Direct Digital Synthesizer (DDS) circuits or phase-locked-loop (PLL) circuits.

Accordingly, this technology provides a number of advantages including methods and systems that generate a modulation frequency for a 3D imaging system, in which the frequency can be quickly changed to nearly any arbitrary value and can be done without the use of an additional signal switching circuit. Additionally, this technology provides methods and systems that generate a modulation frequency for a 3D imaging system in which the phase of the modulation also can be quickly changed to any arbitrary value as well. Further, with this technology neighboring 3D imaging systems can identify and quickly utilize a non-offending modulation frequency to eliminate interference and 3D imaging process corruption.

BRIEF DESCRIPTION OF THE DRAWINGS

FIG. 3 is an example of a table of frequency values and frame rates illustrating relationships between various signals of the three-dimensional imaging system illustrated in FIG. 1;

DETAILED DESCRIPTION

Figure 1:
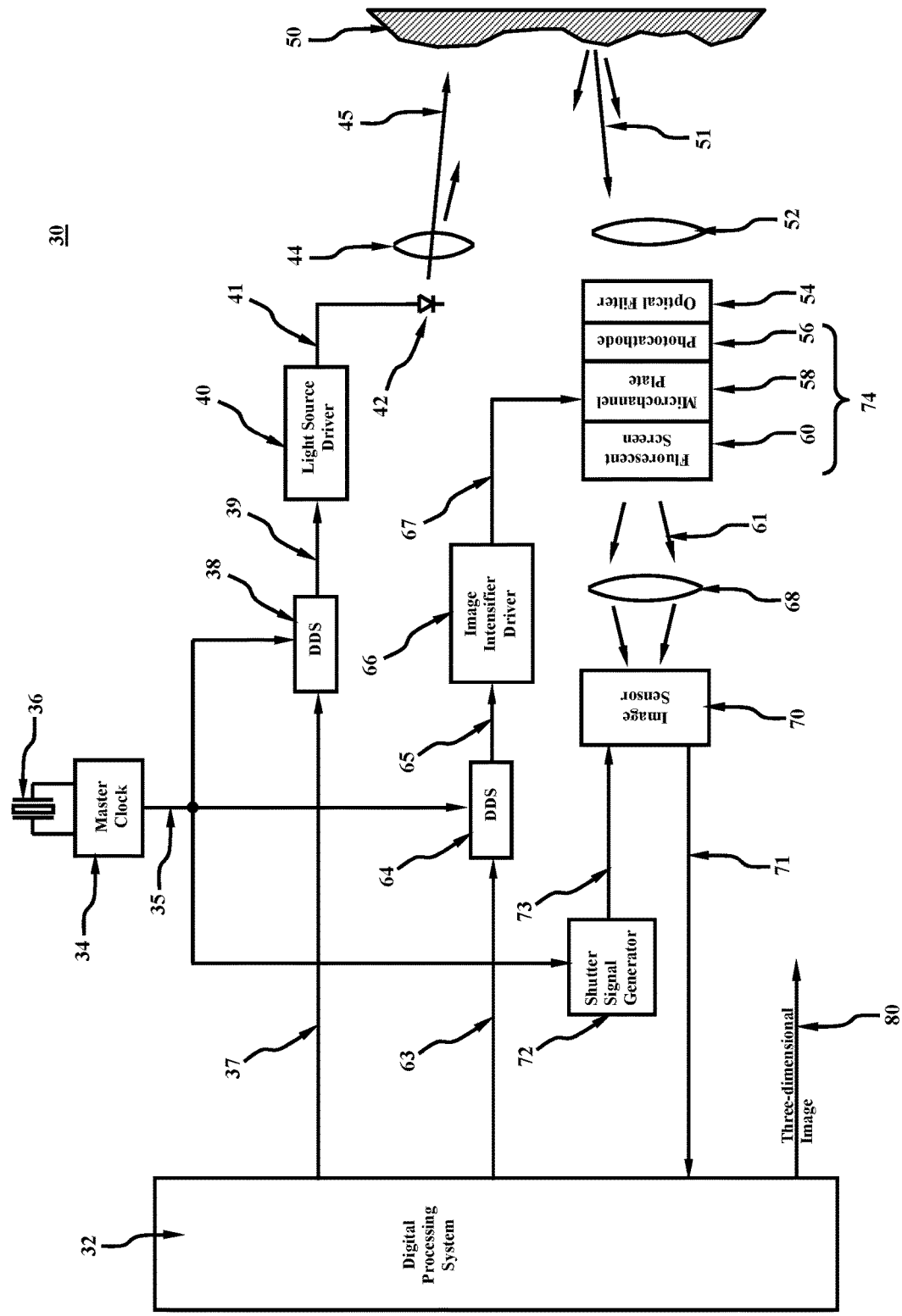
FIG. 1 is a block diagram of an example of a three-dimensional imaging system with direct digital synthesizers used to generate image intensifier and light source modulation signals.

An example of a three-dimensional imaging system 30, also known as range cameras or time-of-flight cameras, is illustrated in FIG. 1. This example of the three-dimensional imaging system 30 captures all the image information of a conventional two-dimensional monochrome camera plus spatial information along one additional axis. In this example, the third axis is along a radial direction away from the three-dimensional imaging system 30 and the additional information is in the form of a distance measurement, although other arrangements may be used. The three-dimensional imaging system 30 measures the distance, or relative distance, to each image location in the target for each pixel comprising the captured image as described by way of examples in greater below. This technology provides a number of advantages including improved methods and systems that generate a modulation frequency for a 3D imaging system in which the frequency and optionally phase can be quickly changed to nearly any arbitrary value and can be done without the use of an additional signal switching circuit.

Referring more specifically to FIG. 1, the three-dimensional imaging system 30 includes a digital processing system 32, a common frequency source comprising master clock 34 and crystal oscillator 36, a first direct digital synthesizer (DDS) 38, a second direct digital synthesizer (DDS) 64, a light emission system comprising a light source driver 40, a light source 42, and one or more light source lenses 44, and an image capture system comprising one or more imaging lens 52, an optical filter 54, an image intensifier 74, a relay lens 68, an image sensor 70, and a shutter signal generator 72, although the three-dimensional imaging system may comprise other types and/or numbers of other components or other elements in other configurations.

The digital processing system 32 may include a processing unit and a memory, although the digital processing system 32 can have other numbers and/or types of components and other elements in other configurations. The memory stores programmed instructions and data for capturing or otherwise generating a three-dimensional image as described and illustrated herein for execution by the processing unit, although some or all of these instructions and data may be stored elsewhere. A variety of different types of memory storage devices, such as a random access memory (RAM), a read only memory (ROM), hard disk, CD ROM, USB thumb-drive, or other computer readable medium which is read from and/or written to by a magnetic, optical, or other reading and/or writing system coupled to the processing unit, can be used for the memory.

By way of example only, the digital processing system 32 could be a conventional microprocessor with an external memory or the digital processing system 32 can be a microcontroller with all memory located onboard. In another example, the digital processing system 32 could be a digital signal processor (DSP) integrated circuit, which is a microcomputer that has been optimized for digital signal processing applications, including Fourier transforms. In yet another example, the digital processing system 32 could be a graphical processing unit (GPU) integrated circuit, which is a microcomputer that has been optimized for parallel-processing applications. The digital processing system 32 could be as simple as a sixteen bit integer device for low-cost applications or the digital processing system 32 can be a thirty-two bit or sixty-four bit or higher floating point device or system for higher performance when cost is not an issue. Also, by way of example only, the digital processing system 32 could be an FPGA (Field-programmable gate array) or a CPLD (complex programmable logic device) which are attractive for use in examples of this technology owing to their compact and cost-effective hardware implementations.

In this example, the digital processing system 32 has a tuning word $TW_1$ output 37 coupled to an input of a first direct digital synthesizer (DDS) 38. The digital processing system 32 also has a $TW_2$ output 63 coupled to an input of second direct digital synthesizer (DDS) 64. The digital processing system 32 also has a distance map output 80 over which digitized three-dimensional images captured by the three-dimensional imaging system 30 may be output to for example an autonomous vehicle or to an operator by way of example only. The digital processing system 32 also has an input coupled to an image sensor communication link 71 from the image sensor 70 over which digitized images captured by the image sensor 70 are sent.

The common frequency source comprises a crystal oscillator 36 which generates a frequency, $f_{clk}$, utilized by a master clock 34 to generate a master clock signal 35, although other types of frequency sources may be used. The master clock signal 35 of the master clock 34 is coupled to an input of the first direct digital synthesizer (DDS) 38, which has a first DDS output 39 coupled to an input of a light source driver 40. The master clock signal 35 of the master clock 34 is also coupled to an input of the second direct digital synthesizer (DDS) 64 has a second DDS output 65 coupled to an input of image intensifier driver 66. The master clock signal 35 of the master clock 34 is also coupled to an input of the shutter signal generator 72. Each of these couplings is direct, thereby ensuring that each of these electronic circuits receives the same frequency, hereinafter referred to as $f_{clk}$, and the relative phase of the frequency at each of the electronic circuits, with respect to the other electronic circuits, is substantially constant over time.

One example of a suitable frequency for crystal oscillator 36 is $f_{clk}=134,217,728$ Hertz, which is $2^{27}$ Hertz, which is readily divided or otherwise manipulated to provide frequencies for use by the first DDS 38, second DDS 64, and shutter signal generator 72, although other frequencies can be used as the frequency produced by the crystal oscillator 36. The crystal oscillator 36 should have good frequency accuracy, such as ±1.5 ppm, and low temperature variation such as ±10 ppm over its temperature range. By way of example only, one off-the-shelf candidate for use as the crystal oscillator 36 is the Si530 from Silicon Labs of Austin, Tex., USA.

In this example one of the requirements for the signals within this three-dimensional imaging system 30 is that the light source drive signal 41, the image intensifier drive signal 67, and the shutter control signal 73 must all be coherent. Deriving, or otherwise generating these three signals from a common signal, namely the master clock signal 35, ensures this coherence. Two of these three signals, the light source drive signal 41 and the image intensifier drive signal 67, are generated from the master clock signal 35 by the use of first direct digital synthesizer 38 and second direct digital synthesizer 64.

The first DDS 38 is an electronic circuit that is used to generate and output substantially any frequency and phase from an input reference frequency. The first DDS 38 works by way of converting the input frequency to an output frequency according to the formula $f_{out}=f_{in} \times TW_1/2^{32}$, where $f_{out}$ is the output frequency (i.e., the frequency of first DDS output 39), $f_{in}$ is the input frequency (i.e., the frequency of the reference clock signal 35), and $TW_1$ is the tuning word (input to the first DDS 38 via the $TW_1$ output 37), although other formulae for use in a DDS can be used as well. As an example, if $f_{in}=f_{clk}=134,217,728$ Hertz, $TW_1$ is 800,000,000, then $f_{out}=25,000,000$ Hertz. A first DDS output 39 from the first DDS 38 is coupled to an input of light source driver 40.

The second DDS 64 is an electronic circuit that is used to generate and output substantially any frequency and phase from an input reference frequency. The second direct digital synthesizer (DDS) 64 works by way converting the input frequency to an output frequency according to the formula $f_{out}=f_{in} \times TW_2/2^{32}$, where $f_{out}$ is the output frequency (i.e., the frequency of second DDS output 65), $f_{in}$ is the input frequency (i.e., the frequency of the reference clock signal 35), and $TW_2$ is the tuning word (input to the second DDS 64 via the $TW_2$ output 63), associated with the second DDS 64, although other formulae for use in a DDS can be used as well. As an example, if $f_{in}=f_{clk}=134,217,728$ Hertz, $TW_2$ is 800,000,512, then $f_{out}=25,000,016$ Hertz.

A second DDS output 65 from the second DDS 64 is coupled to an input of image intensifier driver 66, whose output image intensifier drive signal 67 is coupled to the micro-channel plate 58 section of the image intensifier 74 such that the intensification gain of the image intensifier 74 can be continuously controlled (i.e., the gain of the image intensifier 74 is not necessarily binary, but instead the intensification gain can be any value between its nominal maximum and zero-gain values).

A light emission system comprises the light source driver 40, a light source 42, and one or more light source lenses 44, although the light emission system may comprise other types and/or numbers of other components or other elements in other configurations. In this example, a light source drive signal 41 output by the light source driver 40 is coupled to an input of the light source 42, which emits an illuminating light 45 through the one or more light source lenses 44 such that the illuminating light 45 emitted by the light source 42 is focused and directed onto a target 50, such as a target object or target scene.

The light source driver 40 circuit accepts as an input the first DDS output 39 signal produced by the D/A converter of the first DDS 38 and produces a substantially higher-powered electronic output that is coupled to an input of the light source 42. The output signal produced by the D/A converter of first DDS 38 has conversion noise which must be filtered by circuitry within the light source driver 40 so that the light source drive signal 41 output by the light source driver 40 has minimal noise and is substantially sinusoidal. The filtering within the light source driver 40 can be implemented as an analog low pass filter, having three or more orders, although other filters can be used, such as a bandpass filter, a low-pass filter having two orders, or even a digital filter. If the filter is implemented as a low-pass filter, the cutoff frequency should be approximately the same frequency produced by the preceding DDS (the first DDS 38), being 25 MHz cited in the example above. Once the light source driver 40 has filtered the input signal, the light source driver 40 must then power-amplify and level shift the signal to that level required to adequately drive the light source 42. Depending on the type of device used as the light source 42, the amplitude of the sinusoid output by the light source driver 40 can be between 1.0 and 10.0 volts, 0.1 and 100.0 Amps, and have a DC offset of between 0.0 and 10.0 Volts.

The light source 42 converts the light source drive signal 41 output by the light source driver 40 circuit into an electromagnetic emission, such as an optical wavelength of light, that is subsequently used to illuminate the target 50, such as a target object or target scene in this example. The light produced by the light source 42 can be in the ultra-violet, visible, or infrared, regions of the spectrum, but should emit a wavelength that the photocathode 56 of the image intensifier 74 is responsive to. Note that whatever wavelength the light source 42 emits, the emission must be modulated in accordance with the sinusoidal light source drive signal 41 input to the light source 42. The light source 42 can be for example a laser, a diode laser, or an LED (light emitting diode) including super-luminescent LEDs, although other types of light sources may be used. The light source 42 also can be a single emitter of light or a plurality of emitters.

The light source lens 44 is nominally installed immediately in front of a light source 42 and is used to condense the light emitted by the light source 42, direct the light onto the target 50 and do so in a way that the target 50 is wholly illuminated. Note the back-reflected light 51 has the same wavelength as the illuminating light 45, although its phase changes spatially in accordance with the topography of the various elements comprising the target 50.

The imaging lens 52 is a lens or lens system which is positioned to focus a portion of back-reflected light 51 from the target 50 on to the photocathode 56 of the image intensifier 74 through optical filter 54. The optical filter 54 is a narrow bandpass filter with a bandwidth of a few tens of nanometers wide, wherein the passband of the optical filter 54 is chosen so the wavelengths of the electromagnetic emission 45 emitted from the light source 42 lies within the passband while substantially blocking all other wavelengths, particularly those wavelengths that photocathode 56 is responsive to, although the optical filter 54 can be configured in other manners.

A portion of illuminating light 45 is back-reflected from the target 50, shown as back-reflected light 51 in FIG. 1. A portion of back-reflected light 51 is then incident on imaging lens 52 which causes an image of the target 50 to be focused onto photocathode 56 of image intensifier 74 through optical filter 54, although the optical filter 54 and imaging lens 52 could be swapped so that the back-reflected light 51 passes through optical filter 54 first before entering imaging lens 52.

Light that is imaged onto the photocathode 56 of the image intensifier 74 is converted into electrons by the photocathode 56. Next, the electrons enter the micro-channel plate 58 section of the image intensifier 74 and are amplified or intensified by several orders of magnitude, and accelerated, before striking the fluorescent screen 60 section of the image intensifier 74. Consequently, an amplified or intensified image of the image focused on the photocathode 56 is generated and presented on the fluorescent screen 60 of the image intensifier 74.

Screen output light 61 emitted by the fluorescent screen 60 of the image intensifier 74 enters a relay lens 68 which causes an image of the image presented on the fluorescent screen 60 to be formed on image sensor 70. A shutter control signal 73 output from the shutter signal generator 72 is input to the image sensor 70. A shutter signal generator 72 also has as an input to the master clock signal 35 from the master clock 34.

Figure 2:
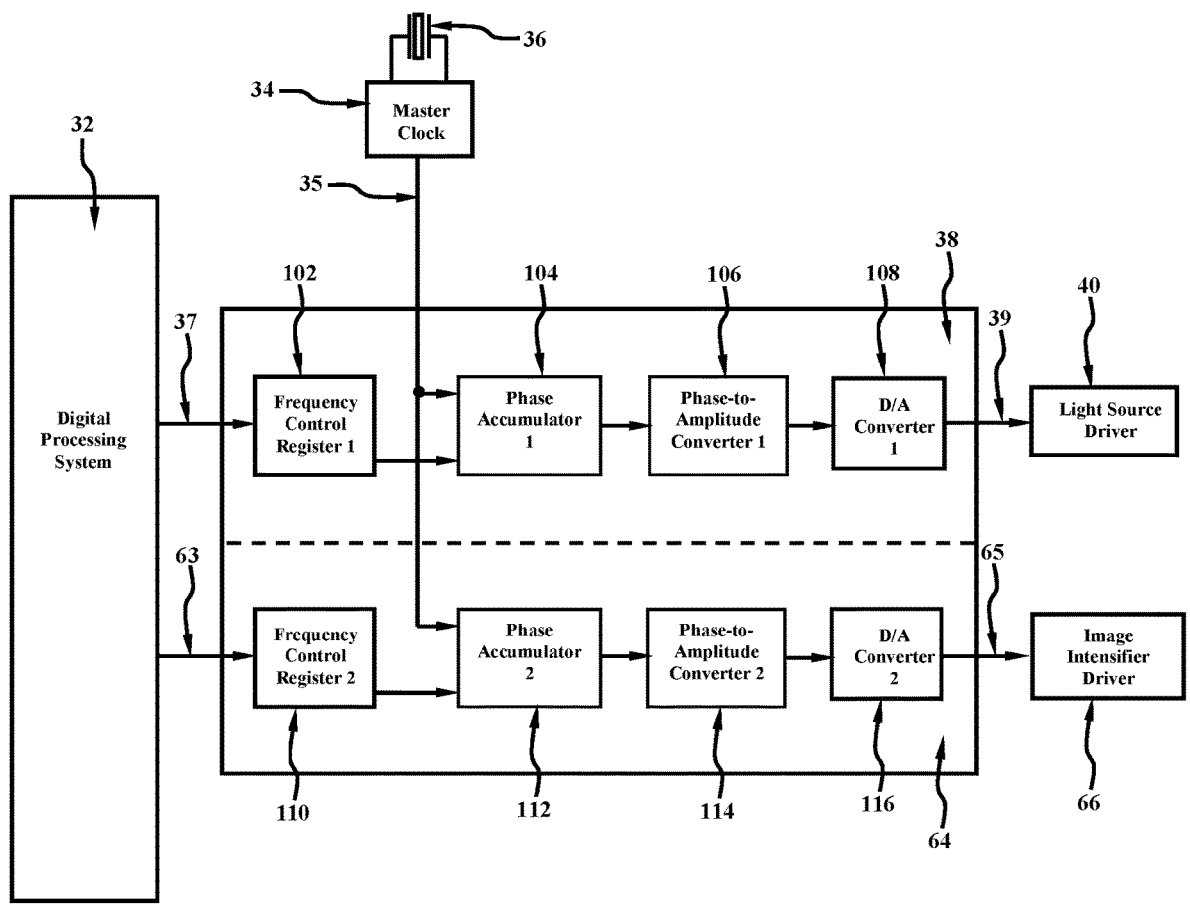
FIG. 2 is a block diagram of an example of dual direct digital synthesizers co-located or housed in a common package as an alternative configuration in the three-dimensional imaging system illustrated in FIG. 1.

Referring to FIG. 2, an example of the first DDS 38 and second DDS 64 co-located or housed in a common package as an alternative configuration in the three-dimensional imaging system 30 is illustrated. One example of this common packaging is the AD9958 2-channel 500 MSPS DDS from Analog Devices (Norwood, Mass., USA), in which two DDS's are enclosed in a single CP-56-1 style integrated circuit package, although other DDS integrated circuits from other suppliers are available as well, and they may or may not be integrated onto a single integrated circuit.

The first direct digital synthesizer 38 shown in FIGS. 1 and 2 comprises a first frequency control register 102, a first phase accumulator 104, a first phase-to-amplitude converter 106, and a first digital-to-analog converter 108. The $TW_1$ output 37 from the digital processing system 32 is coupled to an input of the first frequency control register 102, and first frequency control register 102 stores the value of the tuning word of $TW_1$ output 37 within the first direct digital synthesizer 38 for later use. An output of the first frequency control register 102 is coupled to an input of the first phase accumulator 104 which in turn has an output coupled to an input of the first phase-to-amplitude converter 106. First phase-to-amplitude converter 106 has an output coupled to an input of the first digital-to-analog converter 108, which in turn has a first DDS output 39 that exits the first direct digital synthesizer 38 and is coupled to an input of the light source driver 40.

Similarly, the second direct digital synthesizer 64 shown in FIGS. 1 and 2 comprises a second frequency control register 110, a second phase accumulator 112, a second phase-to-amplitude converter 114, and a second digital-to-analog converter 116. The $TW_2$ output 63 from the digital processing system 32 is coupled to an input of the second frequency control register 110, and second frequency control register 110 stores the value of the tuning word of $TW_2$ output 63 within the second direct digital synthesizer 64 for later use. An output of the second frequency control register 110 is coupled to an input of the second phase accumulator 112 which in turn has an output coupled to an input of the second phase-to-amplitude converter 114. Second phase-to-amplitude converter 114 has an output coupled to an input of the second digital-to-analog converter 116, which in turn has a second DDS output 65 that exits the second direct digital synthesizer 64 and is coupled to an input of the image intensifier driver 66. To maintain signal coherency, the clock signal input of first phase accumulator 104 is coupled to the clock signal input of second phase accumulator 112, and both of these inputs in turn are coupled to the master clock signal 35.

The image intensifier driver 66 circuit accepts as an input the second DDS output 65 from the D/A converter of second DDS 64 and produces a substantially higher-powered electronic image intensifier drive signal 67 output that is coupled to the microchannel plate 58 section of the image intensifier 74. Since the second DDS output 65 signal produced by the D/A converter of second DDS 64 contains conversion noise, the DDS output signal 65 must be filtered by circuitry within the image intensifier driver 66 so that the image intensifier drive signal 67 output by the image intensifier driver 66 has minimal noise and is substantially sinusoidal. The filtering within the image intensifier driver 66 can be implemented as an analog low pass filter, having three or more orders, although other filters can be used such as a bandpass filter, a low-pass filter having two orders, or even a digital filter. If the filter is implemented as a low-pass filter, the cutoff frequency should be approximately the same frequency produced by the preceding DDS (the second DDS 64), being 25,000,016 Hz cited in the example above. Once the image intensifier driver 66 has filtered the input signal, the image intensifier driver 66 must then amplify and level-shift the sinusoid to that level required to adequately drive the microchannel plate 58 of the image intensifier 74. Depending on the particular model used as the image intensifier 74, the amplitude of the sinusoid output by the light source driver 40 can be between 0.1 and 100.0 volts and have a DC offset of between 0.0 and −100.0 Volts.

The image intensifier 74 comprises a light-sensitive photocathode 56, a microchannel plate 58, and a fluorescent screen 60, although image intensifier 74 could comprise other numbers and types of components in other configurations. A photon, of a wavelength that the photocathode 56 is responsive to, that is incident on the photocathode 56, is absorbed by the photocathode 56 which thereupon emits an electron into one of the several pores (a.k.a. micro-channels) within the microchannel plate 58 of the image intensifier 74. The microchannel plate 58, by virtue of the high-voltage potential across it, accelerates the electron which then collides with a sidewall of the pore which causes more electrons to be released into the pore, which are also accelerated by the potential and which in turn also collide with a sidewall of the pore, and so on, until several thousand electrons are released into the pore in an avalanche effect. The release of several thousand electrons stemming from the injection of one electron into the pore is an electronic amplification effect, which will subsequently lead to an image intensification effect. The several thousand electrons that exit the pore of the microchannel plate 58 are subsequently drawn to a fluorescent screen 60 which is located in close proximity to the microchannel plate 58. These exiting electrons are subsequently incident on and absorbed by the fluorescent screen 60, which subsequently emits several thousand photons in response to the absorption of the several thousand electrons that exit the pore. Since the absorption of one incident photon on the photocathode 56 has led to the emission of several thousand photons from the fluorescent screen 60, for each minute pore within the microchannel plate 58, the image emitted by the fluorescent screen 60 is an image that has been intensified by at least three orders of magnitude compared to the image formed on the photocathode 56. An image intensifier suitable for use in examples of this technology is the XX1450ALS from Photonis, of Lancaster, Pa., USA. It's photocathode, microchannel plate, and fluorescent screen are 18 mm in diameter, has a gain of approximately 5000 at 850 nm, and can accept a maximum image intensifier drive signal 67 frequency of over 1 GHz.

One attractive feature of an image intensifier 74 is that its intensification gain can be varied by varying the voltage of the microchannel plate 58 relative to the photocathode 56. In general, the more negative the photocathode's 56 voltage potential is with respect to the entrance face of the microchannel plate 58, the greater the gain of the image intensifier 74. As will be seen later, this gain-varying feature will be utilized to heterodyne (or homodyne) the sinusoidally-temporally modulated image formed on the photocathode 56 with the image intensifier drive signal 67 output by the image intensifier driver 66 to produce a cyclical (in time) and intensified image at the fluorescent screen 60.

A relay lens 68 then forms an image of the image present on the fluorescent screen 60 on the light-sensitive surface of image sensor 70. The image sensor 70 thereupon captures the image, converts the image into an electronic format, and transmits the electronic image to the digital processing system 32 over image sensor communication link 71. The image sensor 70 has several characteristics that must be considered for use in examples of this technology. For example, its frame rate must be at least as fast as the desired frame rate of the three-dimensional imaging system 30. Image sensor 70 need not be a color image sensor because the fluorescent screen 60 outputs a substantially monochrome image. However, the image sensor 70 should have good SNR characteristics, and a dynamic range equivalent to at least 12-bits of gray depth to minimize quantization noise. The resolution or pixel count of the image sensor 70 is also important, with VGA-level (640×480 pixels) resolution being readily available, although megapixel image sensors will provide for higher-resolution 3D imagery. One suitable off-the-shelf image sensor that has been used in examples of this technology is the ICX414 from Sony (Kanagawa, Japan), which is monochromatic, has 656×492 pixel resolution, and can operate at up to 84 frames per second.

Referring to FIGS. 1-3, an example of the operation of generating signals with the DDS 38 and DDS 64 for the three-dimensional imaging system 30 will now be illustrated and described. In this example, at power-up the master clock 34 begins to oscillate at the master clock frequency, $f_{clk}$, which appears on the master clock signal 35 which is then identically input to both the first phase accumulator 104 and the second phase accumulator 112. Shortly after power-up the digital processing system 32 will issue a first tuning word over $TW_1$ output 37 which is then input to the first frequency control register 102 which then stores this digital data in its internal register, and also outputs this same tuning word to the first phase accumulator 104. The first phase accumulator 104 is simply a digital adder and accumulator (i.e., first phase accumulator 104 stores the results of the addition in its internal memory) in which the tuning word $TW_1$ is added to the value stored in its memory on every cycle of the master clock signal 35. This accumulated running sum, which is stored in memory, is also output by the first phase accumulator 104 and in turn is used by the first phase-to-amplitude converter 106 as an index into a look-up-table within the first phase-to-amplitude converter 106. That is, for example, if $TW_1$ has a value of 1000, at power-up or reset the output of the first phase accumulator 104 will be 0, then after the first clock pulse of the master clock signal 35 its output will be 1000, then 2000 after the second pulse of the master clock signal 35, then 3000 after the third, and so on. These (running-sum) output values are then used to determine the correct value of the desired sinusoid by way of a look-up-table in the first phase-to-amplitude converter 106 using the running-sum output as an index into the table. Once the entry in the look-up-table is found, corresponding to an amplitude value along the sinusoid, the digital representation of this value is output by the first phase-to-amplitude converter 106 and input to the first digital-to-analog converter 108 that converts the looked-up value to an analog signal. This analog signal is the first DDS output 39 signal, and is output by the first direct digital synthesizer 38 and subsequently is input to the light source driver 40.

Also shortly after power-up the digital processing system 32 will issue a second tuning word over $TW_2$ output 63 which is then input to the second frequency control register 110 which then stores this digital data in its internal register, and also outputs this same tuning word to the second phase accumulator 112. The second phase accumulator 112 is simply a digital adder and accumulator (i.e., the second phase accumulator 112 stores the results of the addition in its internal memory) in which the tuning word $TW_2$ is added to the value stored in its memory on every cycle of the master clock signal 35. This accumulated running sum, which is stored in memory, is also output by the second phase accumulator 112 and in turn is used by the second phase-to-amplitude converter 114 as an index into a look-up-table within the first phase-to-amplitude converter 114. The (running-sum) values output by the second phase accumulator 112 are then used to determine the correct value of the desired sinusoid by way of a look-up-table in the second phase-to-amplitude converter 114 using the running-sum output of the phase accumulator 112 as an index into the table. Once the entry in the look-up-table is found, corresponding to an amplitude value along the sinusoid, the digital representation of this value is output by the second phase-to-amplitude converter 114 and input to the second digital-to-analog converter 116 that converts the looked-up value to an analog signal. This analog signal is the second DDS output 65 signal, and is output by the second direct digital synthesizer 64 and subsequently is input to the image intensifier driver 66.

Note that the entries in the look-up-table of a DDS determine the waveform shape, being sinusoidal in the preceding description. However, other waveforms are possible, such as a square-wave, triangle-wave, pulsed, or even a sum of other fundamental waveforms such as a sum of sinusoids, or a sum of a sinusoidal and one or more of its harmonics.

There are several benefits in using direct digital synthesizers for generating the source signals for the light source drive signal 41 and the image intensifier drive signal 67. For example, first the frequency of one or both of these drive signals can be quickly changed by simply changing the associated tuning word. Second, the precision of the frequency of the drive signals can be down to milliHertz or even microHertz, even though the signal they are generated from, the master clock signal 35, can be over 100 MegaHertz. This feature is particularly attractive since the difference in frequency between the light source drive signal 41 and the image intensifier drive signal 67 is typically less than a few tens of Hertz, and preferably less than 100 Hz. Third, since the DDS process is digital, the output of a DDS is inherently stable over temperature extremes (as long as the frequency of the master clock signal 35 is stable), and there is no manual frequency tuning as there would be with analog-style oscillators. Fourth, since both the light source drive signal 41 and the image intensifier drive signal 67 are coherent with the master clock signal 35, they will not drift independently with respect to each other; indeed, the only drift will be that due to changes in the master clock signal 35 frequency, which will affect the light source drive signal 41 and the image intensifier drive signal 67 proportionally. Fifth, DDS embodiments allow for the near-instantaneous change of phase of their output signal, which is especially useful for homodyne embodiments of three-dimensional imaging system 30. Lastly, the output signal has low phase jitter, which is particularly important for the present invention since the 3D imaging process is based on the accurate generation and phase-measurement of sinusoidal signals.

The AD9958 DDS device from Analog Devices (Norwood, Mass., USA, 02062) is particularly attractive for use in examples of this technology. The AD9958's output frequency is determined by the formula:

$$f = \frac{TW f_{clk}}{2^{32}} \qquad \text{Equation 1}$$

where f is the output frequency (either $f_{MCP}$ or $f_{illum}$), TW is the tuning word (either $TW_{illum}$ or $TW_{MCP}$, respectively) and $f_{clk}$ is the frequency of the master clock, having an exemplary value of $2^{27}$=134,217,728 Hz, although other values from one Hz up to 4,294,967,296 Hz are usable as well. FIG. 3 presents several illustrative values of $TW_{illum}$ (column 8), $f_{illum}$ (column 9), $TW_{MCP}$ (column 10), and $f_{MCP}$ (column 11) given a value of $f_{clk}$=134,217,728 Hz, whose relationships are determined by Equation 1. Note that the frequency of the image flickering on the fluorescent screen 62 of the image intensifier 74 is $f_{fs}$, having exemplary values noted in the column 2 in FIG. 3. Note that $f_{fs}$ is the frequency of the heterodyning, being equal to the difference between $f_{MCP}$ and $f_{illum}$. For most heterodyning applications the 3D frame rate, the difference between $f_{MCP}$ and $f_{illum}$, should be one Hertz or more. Note further that in heterodyning the difference in frequencies $f_{MCP}$ and $f_{illum}$ is a constant, although the values of $f_{MCP}$ and $f_{illum}$ can change as outlined below in connection with FIG. 6. Note also in heterodyning the phase difference between $f_{MCP}$ and $f_{illum}$ are typically held constant as well, although the phase difference between $f_{MCP}$ and $f_{illum}$ will vary in a homodyne process as described below.

Figure 4:
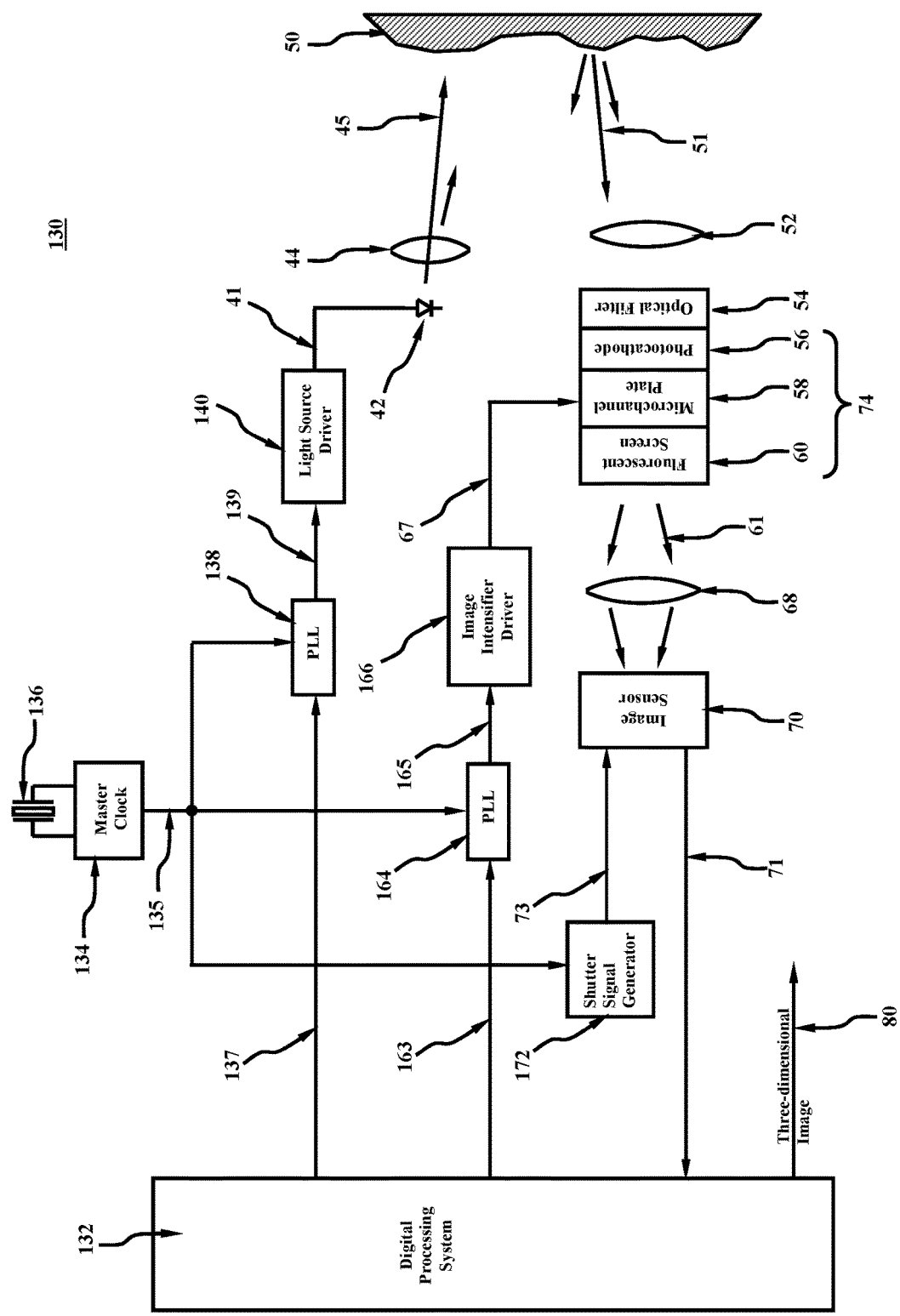
FIG. 4 is a block diagram of an example of another three-dimensional imaging system in which phase-locked loops are used to generate image intensifier and light source modulation signals.
Figure 5:
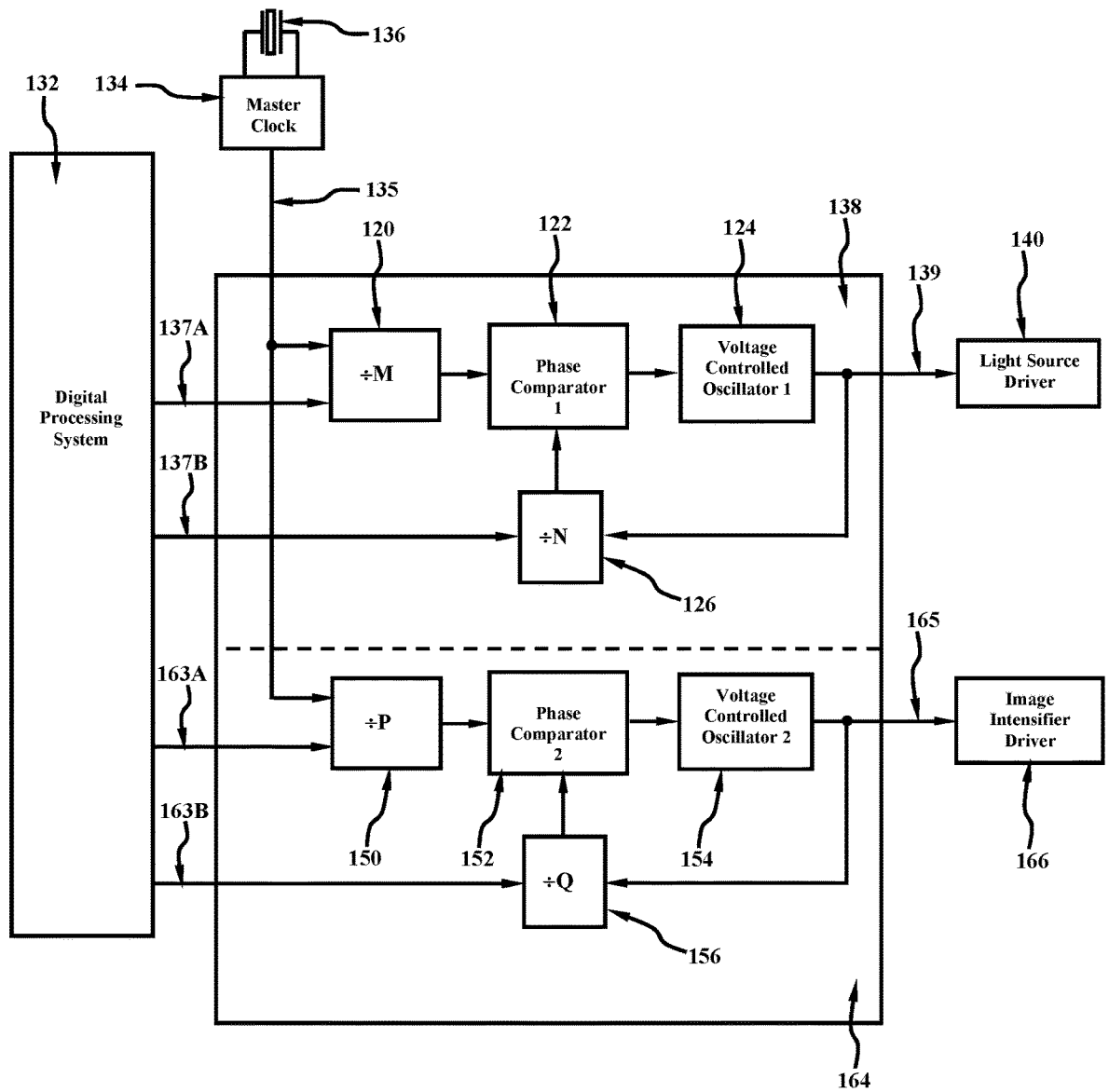
FIG. 5 is a block diagram of an example of dual phase locked loops co-located or housed in a common package as an alternative configuration in the three-dimensional imaging system illustrated in FIG. 4.

Nonetheless, while DDS methods are particularly attractive for use in examples of this technology, these DDSs can be replaced by other signal-generation circuits, such as phase-locked-loops (PLL) circuits as illustrated in FIGS. 4 and 5. Referring more specifically to FIG. 4, an example of generating signals with dual phase locked loops 138 and 164 for another three-dimensional imaging system 130 is illustrated. The three-dimensional imaging system 130 is the same in structure and operation as the three-dimensional imaging system 30, except as illustrated and described by way of the examples herein. Elements in FIGS. 4 and 5 which are like those in FIGS. 1 and 2 in structure and operation will have like reference numbers.

As shown in FIG. 4, the DDS 38 and 64 can be replaced by first PLL 138 and second PLL 164. As seen further in FIG. 5, an example of dual PLLs 138 and 164 co-located or housed in a common package as an alternative configuration in the three-dimensional imaging system 130 in FIG. 4 is illustrated.

In this example the first PLL 138 shown in FIGS. 4 and 5 comprises divide by M logic 120, first phase comparator 122, a first voltage controlled oscillator (VCO) 124, and divide by N logic 126. An input of the divide by M logic 120 is coupled to an output of the digital processing system 132 through which a divide by M signal 137A is sent by the digital processing system 132 to the divide by M logic 120. An output of the divide by M logic 120 is coupled to an input of first phase comparator 122 which in turn has an output that is coupled to an input of first VCO 124. First VCO 124 has an output, which is the first PLL output 139, which is coupled to an input of the light source driver 140 as well as to an input of the divide by N logic 126. Another input of the divide by N logic 126 is coupled to an output of the digital processing system 132 through which a divide by N signal 137B is sent by the digital processing system 132 to the divide by N logic 126. An output of the divide by N logic 126 is coupled to a second input of first phase comparator 122.

The second PLL 164 shown in FIGS. 4 and 5 comprises divide by P logic 150, second phase comparator 152, a second voltage controlled oscillator (VCO) 154, and divide by Q logic 156. An input of the divide by P logic 150 is coupled to an output of the digital processing system 132 through which a divide by P signal 163A is sent by the digital processing system 132 to the divide by P logic 150. An output of the divide by P logic 150 is coupled to an input of second phase comparator 152 which in turn has an output that is coupled to an input of second VCO 154. Second VCO 154 has an output, which is the second PLL output 165, which is coupled to an input of the image intensifier driver 166 as well as to an input of the divide by Q logic 156. Another input of the divide by Q logic 156 is coupled to an output of the digital processing system 132 through which a divide by Q signal 163B is sent by the digital processing system 132 to the divide by Q logic 156. An output of the divide by Q logic 156 is coupled to a second input of second phase comparator 152. Finally, a second input of the divide by M logic 120 is coupled to a second input of the divide by P logic 150, both of which are coupled to the output of the master clock 134. The master clock signal 135 is therefore input to both the divide by M logic 120 and the divide by P logic 150, thereby maintaining signal coherency at these inputs as well as between the light source drive signal 41 derived from first PLL output 139 and the image intensifier drive signal 67 derived from second PLL output 165.

Referring to FIGS. 4 and 5, an example of the operation of generating signals with PLLs 138 and 173 for the three-dimensional imaging system 130 will now be illustrated and described. In this example, at power-up the master clock 134 begins to oscillate at the master clock frequency, $f_{clk}$, which appears on the master clock signal 135 which is then identically input to both the divide by M logic 120 and the divide by P logic 150. Shortly after power-up the digital processing system 132 will issue the divide by M signal 137A to the divide by M logic 120 which then stores the value of M within its internal memory, and the divide by P signal 163A to the divide by P logic 150 which then stores the value of P within its internal memory. Shortly thereafter, the divide by M logic 120 divides the frequency, $f_{clk}$, of the master clock signal 135 by the value of M and outputs this signal, having a frequency of $f_{clk}/M$ to an input of the first phase comparator 122. At about this same time the divide by P logic 150 divides the frequency, $f_{clk}$, of the master clock signal 135 by the value of P and outputs this signal, having a frequency of $f_{clk}/P$ to an input of the second phase comparator 152.

Also, shortly after power-up, first VCO 124 begins to oscillate at a first output frequency, and second VCO 154 begins to oscillate at a second output frequency. In general, the frequency output by first VCO 124 will not be the desired frequency. The output from the first VCO 124, having the incorrect frequency, will be directed to an input of the divide by N logic block 126, which then divides this incorrect frequency by the value of N. This frequency, $f_{out1}/N$, is then also input to the first phase comparator 122 which then compares the frequency and phase of $f_{out1}/N$ to that of $f_{clk}/M$ and outputs a voltage that is proportional to the difference between the two. This output voltage is then input to the first VCO 124 which uses the voltage to adjust its output frequency, $f_{out1}$, so that $f_{out1}/N$ becomes more equal to $f_{clk}/M$. This feedback process continues until $f_{out1}/N$ becomes exactly equal to $f_{clk}/M$, at which point $f_{out1}=N\times f_{clk}/M$. In this way $f_{out1}$, which will be the same frequency as the light source drive signal 41, is also coherent with the master clock signal 135.

Similarly, upon power-up the frequency output by second VCO 154 will not be the desired frequency. The output from the second VCO 154 will be directed to an input of the divide by Q logic block 156, which then divides this incorrect frequency by the value of Q. This frequency, $f_{out2}/Q$, is then also input to the second phase comparator 152 which then compares the frequency and phase of $f_{out2}/Q$ to that of $f_{clk}/P$ and outputs a voltage that is proportional to the difference between the two. This output voltage is then input to the second VCO 154 which uses the voltage to adjust its output frequency, $f_{out2}$, so that $f_{out2}/Q$ becomes more equal to $f_{clk}/P$. This feedback process continues until $f_{out2}/Q$ becomes exactly equal to $f_{clk}/P$, at which point $f_{out2}=Q\times f_{clk}/P$. In this way $f_{out2}$, which is the frequency of second PLL output 165 and image intensifier drive signal 67, will be coherent with the master clock signal 135 and also coherent with light source drive signal 41.

As an example, if $f_{clk}$=134,217,738 Hz, M=P=33,554,432, N=6,250,000, then the frequency of the light source drive signal 41 is 25,000,000 Hz. Furthermore, if Q=6,250,004, then the frequency of the image intensifier drive signal 67 is 25,000,016 Hz, which are the same drive frequencies prescribed earlier in connection with the DDS-based frequency generators.

There are several benefits in using phase-locked loop circuits 138 and 164 for generating the frequency of light source drive signal 41 and the frequency of image intensifier drive signal 67. First, changing the frequency of one or both of these drive signals is quickly accomplished by simply changing the associated value of M, N, P, or Q. Second, since first PLL output 139, light source drive signal 41, second PLL output 165, and the image intensifier drive signal 67 are coherent with the master clock signal 135, they will not drift significantly independently with respect to each other. In this example, the only substantial drift will be that due to changes in the master clock signal 135 frequency, which will affect the light source drive signal 41 and the image intensifier drive signal 67 proportionately by way of proportionate changes in first PLL output 139 and second PLL output 165 respectively.

It is also possible to mix the usage of a DDS and a PLL within the signal-generating circuitry of other examples of this technology. For example, image intensifier drive signal 67 frequency can originate from a PLL circuit 166 and the light source drive signal 41 can originate from a DDS circuit 38, or alternately the image intensifier drive signal 67 frequency can originate from a DDS circuit 64 and the light source drive signal 41 can originate from the PLL circuit 138. Furthermore, the shutter signal generator 72 can also be implemented as a PLL, or as a DDS, instead of the counter prescribed earlier. Other circuit variations are that the $f_{illum}$ signal and/or the $f_{MCP}$ signal can be generated by a digital counter circuit instead of from a DDS or a PLL as described above.

DDS and PLL circuits are frequency generators, and these and other frequency generators are known as "frequency synthesizers". Quoting from Wikipedia (https://en.wikipedia.org/wiki/Frequency_synthesizer) "A frequency synthesizer is an electronic circuit that generates a range of frequencies from a single reference frequency. Frequency synthesizers are used in many modern devices such as radio receivers, televisions, mobile telephones, radiotelephones, walkie-talkies, CB radios, cable television converter boxes, satellite receivers, and GPS receivers. A frequency synthesizer may use the techniques of frequency multiplication, frequency division, direct digital synthesis, frequency mixing, and phase-locked loops to generate its frequencies. The stability and accuracy of the frequency synthesizer's output are related to the stability and accuracy of its reference frequency input. Consequently, synthesizers use stable and accurate reference frequencies, such as those provided by crystal oscillators". Furthermore, many frequency synthesizers—particularly direct digital synthesizers (DDS)—have the ability to modulate or otherwise control the phase of the generated frequency.

An example of the operation of the three-dimensional imaging system 30 in accordance will now be described with reference to FIGS. 1-2. The operation of the three-dimensional imaging system 130 is the same as the three-dimensional imaging system 30 except as otherwise illustrated and described herein by way of the examples. It should be noted that the description presents an example operational regimen and that many other regimens and operating examples are possible, and that the presented description of one example is by no means limiting.

When electrical power is first applied to the three-dimensional imaging system 30 the crystal oscillator 36 begins to oscillate at its prescribed frequency, $f_{clk}$, which for exemplary purposes is 134,217,728 Hertz, although other frequencies are possible as well. Also, upon power up, the digital processing system 32 boots up, if necessary, and then sends first tuning word commands to first DDS 38 over $TW_1$ output 37 and also sends second tuning word commands to second DDS 64 over $TW_2$ output 63. The tuning words, $TW_1$ and $TW_2$ are four-byte integers, for example, that the first DDS 38 and second DDS 64, respectively, use for generating their respective output frequencies. First DDS 38 then begins to synthesize an output frequency, $f_1$, based upon the frequency of $f_{clk}$ and $TW_1$ according to the formula:

$$f_1 = f_{clk} \times TW_1/2^{32} \qquad \text{Equation 2}$$

and second DDS 64 begins to synthesize an output frequency, $f_2$, based upon the frequency of $f_{clk}$ and $TW_2$ according to the formula:

$$f_2 = f_{clk} \times TW_2/2^{32} \qquad \text{Equation 3}$$

Hereinafter, $f_1$ will be the frequency of the modulation of the illumination light 45, re-denoted $f_{illum}$. Similarly $f_2$ will be the frequency of the modulation of the gain of the micro-channel plate 58 section of the image intensifier 74, re-denoted $f_{MCP}$.

Continuing with reference to FIG. 1, the light source driver 40 now generates a light source drive signal 41 which is modulated at frequency $f_{illum}$, which is applied to light source 42. The light source 42 converts the electronic light source drive signal 41 into an electromagnetic emission, the emission being the illuminating light 45. The illuminating light 45, like all electromagnetic emissions, propagates at the speed of light as the illuminating light 45 travels from the light source 42 through the light source lens 44 to the target 50. The modulation waveform of the illuminating light 45 should be a reasonably high-fidelity copy of the waveform of the light source drive signal 41 input to the light source 42.

A portion of electromagnetic radiation or light 45 emitted by the light source 42 that illuminates the target 50 will be reflected back towards the three-dimensional imaging system 30. A portion of this back-reflected light 51 will then be collected by the imaging lens 52, which will collect as much of the back-reflected light 51 as possible, such that the amount of collected back-reflected light 51 is maximized for down-stream heterodyning or homodyning by the image intensifier 74.

Before the back-reflected light 51 reflected from the target 50 reaches the photocathode 56, the back-reflected light 51 first passes through the optical filter 54. The optical filter 54 allows the back-reflected light 51 to pass through largely unattenuated, but substantially blocks or attenuates all other electromagnetic radiation that the photocathode 56 is responsive to. As a result, only the electromagnetic emission generated by the light source 42 and reflected by the target 50 is allowed to reach the photocathode 56. This increases the signal-to-noise ratio of the electromagnetic signal incident on the photocathode 56.

The photocathode 56 is a light-responsive layer coated onto the inside surface of a glass window on the front of the image intensifier 74 onto which the imaging lens 52 images a two-dimensional representation of the target 50. The image on the photocathode 56 is made up of the back-reflected light 51 and still retains the temporal sinusoidal modulation waveform. While each discrete location of the image on the photocathode 56 retains this temporal sinusoidal waveform, the phase of the sinusoid will vary at each discrete location on photocathode 56 in accordance with the distance the imaged portion of the target 50 is from the three-dimensional imaging system 30. Accordingly, the further away from the three-dimensional imaging system 30 a part of the target 50 is, the longer the length of time required for the illuminating light 45 and back-reflected light 51 to reach the target 50 and propagate back to the photocathode 56. This spatially varying propagation time that varies proportionately with distance as a function of object location and topography, results in a spatially varying phase delay of the sinusoid waveform at the photocathode 56. As a result, the phase also varies in accordance with the distance of the target object's or features of the target 50, and this phase delay variation of the imaged back-reflected light 51 is measured on a pixel-by-pixel basis. In this way the relative distance to the target 50 on a pixel-by-pixel basis (or equivalently, by discrete-point-location by discrete-point-location) is known and the ability to generate a third axis of imagery is created.

Photons incident upon photocathode 56 are converted into electrons in which the number of electrons created is proportional to the number of incident photons for each image point on the photocathode 56. The electrons created by the photocathode 56 exit the photocathode 56 surface at which they were generated on a side opposite from the incident photons. As a result, the generated electrons retain the temporal sinusoidal waveform and both the temporal and spatial intensity variations as they leave the photocathode 56. Nonetheless, the number of electrons leaving the photocathode 56 is relatively small (because the image formed on the photocathode 56 is dim), and significant electron amplification is required.

The microchannel plate 58 section of image intensifier 74 then amplifies or intensifies the electronic signal passing therein in accordance with the voltage potential applied between the photocathode 56 and the input face of the microchannel plate 58. The amplification factor or gain of the image intensifier 74 can be made to vary quite fast to the point that the gain of the image intensifier 74 can be continuously varied from its minimum to its maximum in just a few nanoseconds or less. This ability of the image intensifier 74 to vary its gain is important in its ability to effect a heterodyning or homodyning process in which the electronic image signal within the microchannel plate 58 (originating with the photocathode 56 image) is multiplied with the image intensifier drive signal 67.

Fluorescent screen 60 contains phosphor materials that cause the fluorescent screen 60 to glow in brightness proportionate to the number of electrons that pass through the microchannel plate 58 and are subsequently incident upon the fluorescent screen 60. The image of the target 50 is still present in the spatial characteristics of the electrons leaving the micro-channel plate 58 and the photons emitted from the fluorescent screen 60.

The ability of one temporally-varying signal, namely the image intensifier drive signal 67, to control (e.g., through a multiplication process) the amplification of another temporally-varying signal, namely the current flowing through the microchannel plate 58, presents an opportunity for heterodyning. According to Wikipedia (https://en.wikipedia.org/wiki/Heterodyne), "Heterodyning is a signal processing technique invented in 1901 by Canadian inventor-engineer Reginald Fessenden that creates new frequencies by combining or mixing two frequencies. Heterodyning is used to shift one frequency range into another, new one, and is also involved in the process of modulation and demodulation. The two frequencies are combined in a nonlinear signal-processing device such as a vacuum tube, transistor, or diode, usually called a mixer. In an example of a common application, two signals at frequencies $f_1$ and $f_2$ are mixed, creating two new signals, one at the sum $f_1+f_2$ of the two frequencies, and the other at the difference $f_1-f_2$. These new frequencies are called heterodynes. Typically, only one of the new frequencies is desired, and the other is filtered out of the output of the mixer." In examples of this technology, the image intensifier 74 acts as the mixer.

The mathematics behind the heterodyning process in relation to examples of the technology will now be described. First, let the electronic image intensifier drive signal 67 be $$M(t)=O_M+A_M \cos(2\pi f_{MCP}t+\phi_M) \quad \text{Equation 4}$$

where $O_M$ is a constant DC offset, $A_M$ is the amplitude of the sinusoidal modulation, $f_{MCP}$ is the frequency of the sinusoidal modulation, t is time, and $\phi_M$ is a constant phase term. Next consider the weak electronic signal present inside the image intensifier 74 at the inside surface of the photocathode 56, at a spatial location corresponding to the i'th pixel of the image sensor 70. This signal is thus $$P(t)=O_P+A_P \cos(2\pi f_{illum}t+\phi_{i,P}) \quad \text{Equation 5}$$

where $O_P$ is a constant DC offset, $A_P$ is the amplitude of the sinusoidal modulation, $f_{illum}$ is the frequency of the sinusoidal illumination, and $\phi_{i,P}$ represents the phase of P(t) at the spatial location on the photocathode 56 corresponding to the i'th pixel of the image sensor 70. Note that the phase, $\phi_P$, varies spatially across the face of the photocathode 56, in accordance with the elevation or topography of the target 50. That is, $\phi_P$ is actually $\phi_P(X,Y)$, but for brevity only one location—corresponding to the i'th pixel—will be considered, so $\phi_P(X,Y)$ is simplified to $\phi_{i,P}$. Lastly, the maximum full-on gain of the image intensifier, $G_{Max}$, must be introduced.

Multiplying M(t) times P(t) yields the equation for the heterodyned signal (at the i'th pixel location) within the image intensifier 74, and multiplying this product times the maximum gain, $G_{MAX}$, yields the equation for the output signal $FS_i(t)$ from the image intensifier 74 (i.e., the light signal emitted from the fluorescent screen 60, again at the i'th pixel location). Note that $G_{Max}$ does not vary in time, and normally does not vary spatially within the image intensifier 74. Furthermore, $G_{MAX}$ has units of photons/electrons, and is typically on the order of between 1000 and 1,000,000. The heterodyning math follows as:

$$FS_i(t) = M(t) \times P_i(t) \times G_{MAX} \quad \text{Equation 6}$$

$$FS_i(t) = [O_M + A_M \cos(2\pi f_{MCP}t + \phi_M)] \times [O_P + A_P \cos(2\pi f_{illum}t + \phi_{i,P})] \times G_{MAX} \quad \text{Equation 7}$$

$$FS_i(t) = [O_M O_P + O_P A_M \cos(2\pi f_{MCP}t + \phi_M) + O_M A_P \cos(2\pi f_{illum}t + \phi_{i,P}) + A_M A_P \cos(2\pi f_{MCP}t + \phi_M)\cos(2\pi f_{illum}t + \phi_{i,P})] \times G_{max} \quad \text{Equation 8}$$

The $O_M O_P G_{max}$ term represents a constant offset and carries no information about the target 50 and will be removed from consideration in the developing math. Similarly, the $O_M A_P \cos(2\pi f_{illum}t + \phi_{i,P})$ and $O_P A_M \cos(2\pi f_{MCP}t + \phi_M)$ terms have a modulation frequency that is too high for the fluorescent screen 60 (let alone the image sensor 70) to respond to, and therefore are also essentially constant terms that carry no information about the target 50. These terms will also be dropped from consideration, leaving:

$$FS_i(t) = [A_M A_P \cos(2\pi f_{MCP}t + \phi_M)\cos(2\pi f_{illum}t + \phi_{i,P})] \times G_{max} \quad \text{Equation 9}$$

Next, apply the following trigonometric identity to the preceding equation $$\cos\alpha\cos\beta = \frac{1}{2}\cos(\alpha - \beta) + \frac{1}{2}\cos(\alpha + \beta) \quad \text{Equation 10}$$

$$FS_i(t) = \frac{A_M A_P G_{max}}{2}[\cos(2\pi f_{MCP}t + \phi_M - 2\pi f_{illum}t - \phi_{i,p}) + \cos(2\pi f_{MCP}t + \phi_M + 2\pi f_{illum}t + \phi_{i,P})] \quad \text{Equation 11}$$

As before, the $\cos(2\pi f_{MCP}t + \phi_M + 2\pi f_{illum}t + \phi_{i,P})$ results in an effective frequency that is much too high for the fluorescent screen 60 and the image sensor 70 to respond to, and therefore represents an additional constant term that carries no information about the target 50 and will be dropped from consideration, leaving:

$$FS_i(t) = \frac{A_M A_P G_{max}}{2}[\cos(2\pi f_{MCP}t + \phi_M - 2\pi f_{illum}t - \phi_{i,P})]. \quad \text{Equation 12}$$

Next, the $\phi_M$ phase term represents an arbitrary phase of the image intensifier drive signal, 67 and can be set to zero with no loss in generality. Also, let $A_{FS} = A_M A_P G_{max}/2$, the amplitude of the signal present at the fluorescent screen 60, for simplification.

$$FS_i(t) = A_{FS}[\cos(2\pi f_{MCP}t - 2\pi f_{illum}t - \phi_{i,P})] \quad \text{Equation 13}$$

$$FS_i(t) = A_{FS}\cos[2\pi(f_{MCP} - f_{illum})t - \phi_{i,P}] \quad \text{Equation 14}$$

Next, introduce a new frequency term, $f_{fs} = f_{mcp} - f_{illum}$, which is the frequency of the light being displayed on the fluorescent screen 60 of the image intensifier 74.

$$FS_i(t) = A_{FS}\cos(2\pi f_{fs}t - \phi_{i,P}). \quad \text{Equation 15}$$

Equation 15 tells us that the brightness of the fluorescent screen 60 at the location of the i'th pixel varies sinusoidally at a frequency of $f_{fs}$, and at a phase proportional to the distance between the three-dimensional imaging system 30 and the location at the target 50 corresponding to the i'th pixel.

As an example, if $f_{mcp}$ is 25,000,016 Hz and $f_{illum}$ is 25,000,000 Hz as mentioned in a previous example, then $f_{fs} = 25,000,016 - 25,000,000$ Hz = 16.0 Hz. This means that the brightness of the image present on the fluorescent screen 60 will vary sinusoidally at a rate of 16.0 cycles/second, in this example. Note that both the image sensor 70 and fluorescent screen 60 are operative at this relatively low frequency.

As mentioned earlier the phase term $\phi_{i,P}$ carries information about the distance to the target 50. The phase of the i'th pixel varies as a function of emission modulation frequency, $f_{illum}$, and distance $d_i$ to the target object or scene at the location corresponding to the i'th image sensor pixel according to the formula:

$$\phi_{i,P} = \frac{4\pi f_{illum} d_i}{c} \quad \text{Equation 16}$$

where c is the speed of light. As an example, if $f_{illum}$ is 25,000,000 Hz, $c = 3 \times 10^8$ m/s, and $d_i = 3$ meters, then the phase associated with this pixel is $\pi$ radians. Knowing the phase associated with each pixel, or the relative phase of a pixel relative to the other pixels allows one to determine the relative distance of one pixel relative to the relative distances of the others. Therefore, the next step is to mathematically determine the phase, or relative phase, $\phi_{i,P}$, at each of the pixels in order to develop phase and distance maps.

One way to compute the phase of a sinusoidal waveform—or the phase of any repeating or cyclical waveform—is with the use of a Fourier Transform. The mathematical definition of a Fourier Transform is $$X(m) = \sum_{k=0}^{N-1} x_k \left[\cos\frac{2\pi mk}{N} + i\sin\frac{2\pi mk}{N}\right] \quad \text{Equation 17}$$

where $x_k$ is the k'th sample along one cycle of the sinusoid whose phase is to be determined (namely $FS_i(t)$), k is the sample counter, $X(m)$ is the frequency domain signal and is a complex number, m is the frequency counter, N is the number of signal samples used in calculating the transform, and i is the square root of −1. $X(m)$, being a complex number, can be restated as:

$$X(m) = Re(m) + iIm(m) \quad \text{Equation 18}$$

Where Re is the real part and Im is the imaginary part. The magnitude of the m'th frequency component is $$A(m) = \sqrt{Re^2(m) + Im^2(m)} \quad \text{Equation 19}$$

and the phase of the m'th frequency is $$\phi(m) = \tan^{-1}\frac{Im(m)}{Re(m)}. \quad \text{Equation 20}$$

For distance estimation, only the phase of the fundamental frequency m=1 is required. Further simplifications can be made by sampling the sinusoid exactly four times per cycle, which results in what is known as a four-point Discrete Fourier Transform (DFT). For this four-point transform, where N=4 and k=0, 1, 2, and 3, X(1) is:

$$(X)1 = x_0\left[\cos\frac{2\pi 0}{4} + i\sin\frac{2\pi 0}{4}\right] + x_1\left[\cos\frac{2\pi 1}{4} + i\sin\frac{2\pi 1}{4}\right] +$$
$$x_2\left[\cos\frac{2\pi 2}{4} + i\sin\frac{2\pi 2}{4}\right] + x_3\left[\cos\frac{2\pi 3}{4} + i\sin\frac{2\pi 3}{4}\right]$$
Equation 21 which simplifies to $$X(1)=x_0+ix_1-x_2+ix_3$$ Equation 22

It is seen that $Re(1)=x_0-x_2$ and $Im(1)=x_1-x_3$, and the phase at the i'th pixel is $$\phi = \tan^{-1}\frac{x_1-x_3}{x_0-x_2}$$ Equation 23 and the amplitude is $$A=\sqrt{(x_0-x_2)^2+(x_1-x_1)^2}.$$ Equation 24

For each pixel the phase and amplitude determinations are made from only four data points or samples, $x_0$, $x_1$, $x_2$, and $x_3$, obtained directly from the signal FS(t).

Returning to FIG. 1 once again, the screen output light 61 emitted by the fluorescent screen 60 in accordance with $FS_i(t)$ then passes through a relay lens 68 which causes the screen output light 61 to form an image on the image sensor 70. The image sensor 70 then captures the images formed on its image sensor in accordance with the shutter control signal 73 described earlier. The key point here is that the shutter control signal 73, being synchronized with $f_{illum}$ and $f_{mcp}$, by way of the common master clock signal 35, is also synchronized with FS(t). This means that the timing of the image sensor's 70 image capturing process does not change from cycle to cycle of the FS(t) waveform. Furthermore, by a judicious choice of $f_{illum}$, $f_{mcp}$, and the frequency division within the shutter signal generator 72, a precise integer number of images can be captured by the image sensor 70 for each cycle of FS(t). For example, if the frequency of FS(t) is 16.0 Hz (based upon exemplary frequencies of $f_{illum}$=25,000,000 Hz and $f_{mcp}$=25,000,016 Hz) and the shutter frequency is 64 Hz, then exactly 64/16=4 frames of images of FS(t) will be captured and digitized by the image sensor 70 per cycle of FS(t). Furthermore, each of the four frames will be 90° apart along the FS(t) waveform, and each frame contains an $x_m$ data point for all of the pixels of the digitized image. In particular, the first image frame captured by the image sensor 70 has the $x_0$ data for all of the pixels of the digitized image, the second image frame captured by the image sensor 70 has the $x_1$ data for all of the pixels of the digitized image, the third image frame captured by the image sensor 70 has the $x_2$ data for all of the pixels of the digitized image, and the fourth (and last, assuming a 4-pt DFT) image frame captured by the image sensor 70 has the $x_3$ data for all of the pixels of the digitized image.

The first, second, third, and fourth images are transmitted by the image sensor 70 to the digital processing system 32 as they are captured. Next the digital processing system 32 receives these images in sequence as they are captured, and processes the $x_0$, $x_1$, $x_2$, and $x_3$ data as described above to compute the phase and amplitude for each pixel. Digital processing system 32 then converts the phase, $\phi$, information to distance by use of the formula Distance=$\phi c/(4\pi f_{illum})$ for each pixel of the image. The digital processing system 32 can then arrange the pixel amplitude data into a two-dimensional array which is used to represent the relative reflectance of each point in the target 50 corresponding to the location in the two-dimensional array, meaning the array is substantially a standard monochrome bitmapped image of the target 50. Finally, the digital processing system 32 arranges the pixel distance data into a two-dimensional array which is used to represent the relative distance of each point in the target 50 corresponding to the location in the two-dimensional array, meaning the array is a "distance image" of the target 50.

Up to this point the exemplary values for $f_{clk}$=134,217,728 Hz, $f_{mcp}$=25,000,016 Hz, $f_{illum}$=25,000,000 Hz, $f_{fs}$=16.0 Hz, the number of points, N, in the DFT is four, and $f_{shutter}$=64 Hz. These values are quite useful for descriptive purposes, but other values are possible as well. For example, $f_{mcp}$ and $f_{illum}$ can vary from 100 kHz, or less, up to 10 GHz, or more, but values of $f_{mcp}$=50,000,008 Hz and $f_{illum}$=50,000,000 Hz are also useful, in which case $f_{fs}$=8.0 Hz and $f_{shutter}$ must be 32 Hz for a four-point DFT. The table in FIG. 3 illustrates several variations of $f_{shutter}$, $f_{fs}$, N DFT points, the exponent K of the division factor $2^K$ for $f_{shutter}$ generation, and DDS tuning words for the case where $f_{clk}$=134,217,728 Hz and $f_{illum}$=25,000,000 Hz, although $f_{clk}$ and $f_{illum}$ can have other values as well.

Note that to this point the value of frequency $f_{illum}$ has been of a different value than the frequency for $f_{mcp}$ in accordance with the concept of heterodyning. However, another mixing concept called homodyning can be employed in which $f_{illum}=f_{mcp}$, and the phase of the signal present in first DDS output 39 or second DDS output 65 can vary in discrete steps during the 3D image capturing process. The homodyne math is similar to the heterodyne math described above, and can proceed from Equation 14 which is repeated here:

$$FS_i(t)=A_{FS}\cos[2\pi(f_{mcp}-f_{illum})t-\phi_{i,P}]$$ Equation 14

Equation 14 must be modified in two ways: 1) by noting that $f_{mcp}-f_{illum}$ and the $2\pi(f_{mcp}-f_{illum})$ t term is zero, and 2) introduce a new phase term, $\phi_{shift}$, corresponding to the shift in phase created by first DDS 38 or second DDS 64 between frames captured by image sensor 70, resulting in Equation 25:

$$FS_i(t)=A_{FS}\cos[\phi_{Shift}-\phi_{i,P}]$$ Equation 25

For a four-point DFT, $\phi_{shift}=n\pi/2$, where n=0, 1, 2, or 3. From here the math proceeds akin to Equations 16 through 24, resulting in a phase or distance map of the target 50 as well as a corresponding amplitude or reflectance map.

Note that in heterodyning the signal on the fluorescent screen 60 is changing during the time the shutter of the image sensor 70 is open, resulting in a convoluted image being captured by the image sensor 70 and subsequently processed by digital processing system 32. However, in a homodyne implementation the signal on the fluorescent screen 60 is substantially constant during the time the shutter of image sensor 70 is open, resulting in a non-convoluted image being captured by the image sensor 70 and subsequently processed by digital processing system 32. The difference between processing non-convoluted homodyne images as opposed to convoluted heterodyne images leads to a factor of two improvement in SNR and a factor of square-root of two in range.

By way of example only, applications for the present invention include guidance and navigation systems for autonomous and semi-autonomous vehicles, as well as collision avoidance for vehicular usage. The present invention also can be used for consumer photography, augmented reality and virtual reality, as well as for cinematography. Security applications can include three-dimensional surveillance and facial recognition. Industrial applications are manifold, including robotics, parts sorting and bin picking, for example.

Figure 6:
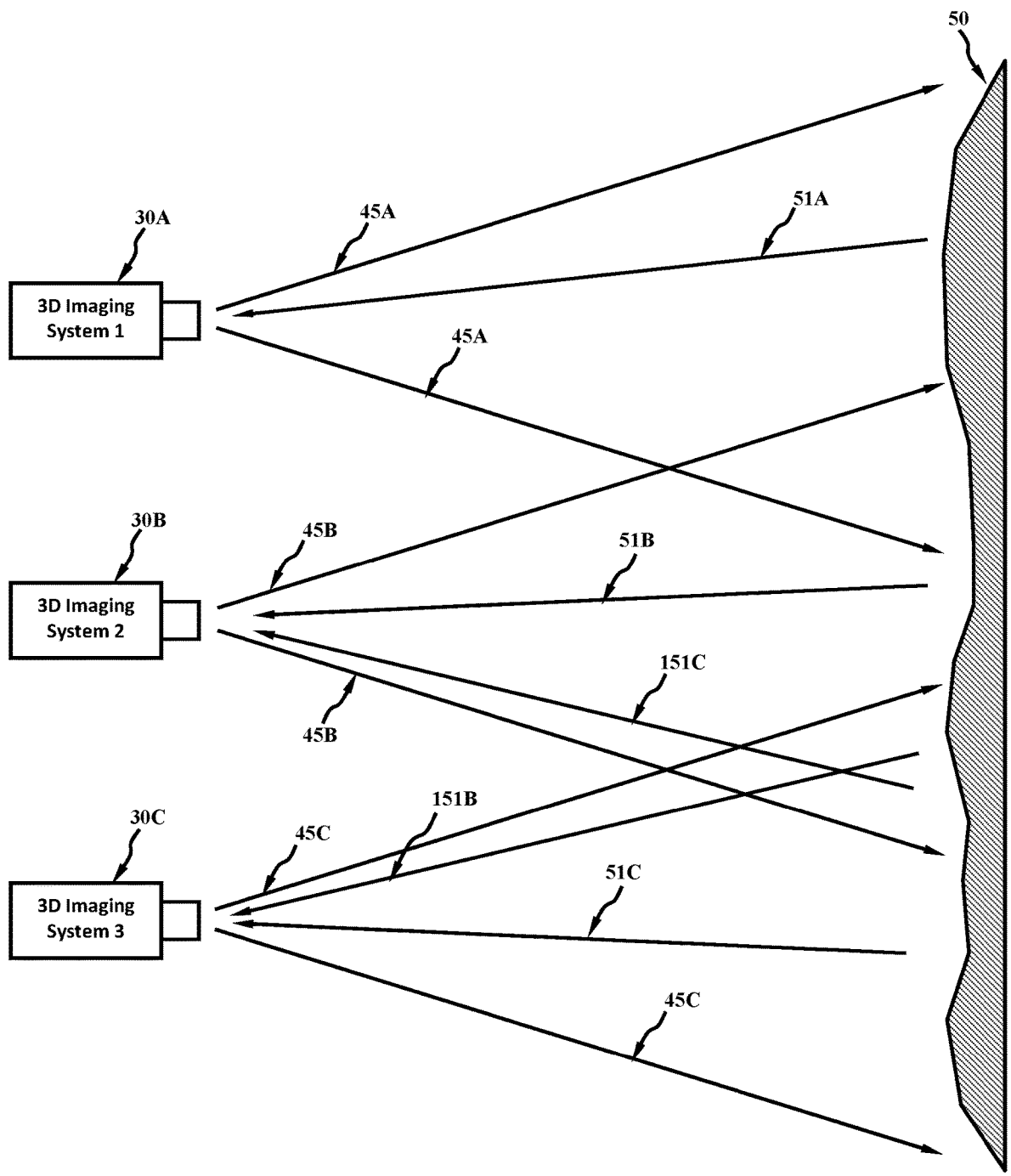
FIG. 6 is diagram of an example of a configuration of emissions and fields-of-view of three three-dimensional imaging systems overlapping at a target.

Referring to FIG. 6, an example of a configuration of emissions and fields-of-view of three-dimensional imaging systems 30A, 30B, and 30C overlapping at a target 50. In this example three-dimensional imaging systems 30A, 30B, and 30C are each the same in structure and operation as three-dimensional imaging system 30 as illustrated and described with reference to FIGS. 1 and 2. In this example, an undesirable situation can arise when two or more three-dimensional imaging systems 30A, 30B, and 30C attempt to capture imagery of the same target 50 at the same time.

As illustrated in FIG. 6, in this example there is a first three-dimensional imaging system 30A emitting illuminating light 45A, a second three-dimensional imaging system 30B emitting illuminating light 45B, and a third three-dimensional imaging system 30C emitting illuminating light 45C. Illuminating light 45A, illuminating light 45B, and illuminating light 45C are all directed onto the same target 50 in such a way that the illuminating fields of light from the three three-dimensional imaging systems partially overlap. Furthermore, three-dimensional imaging system 30A has an imaging field of view that substantially matches the illumination envelope of illuminating light 45A. Additionally, three-dimensional imaging system 30B has an imaging field of view that substantially matches the illumination envelope of illuminating light 45B. Further, three-dimensional imaging system 30C has an imaging field of view that substantially matches the illumination envelope of illuminating light 45C.

A portion of illuminating light 45A is back-reflected from the target 50 as back-reflected ray 51A which is incident on the image intensifier photocathode of first three-dimensional imaging system 30A and contributes to the 3D imaging process of the target 50 within the field of view of first three-dimensional imaging system 30A. Similarly, a portion of illuminating light 45B is back-reflected from the target 50 as back-reflected ray 51B which is incident on the image intensifier photocathode 56 of second three-dimensional imaging system 30B and contributes to the 3D imaging process of the target 50 within the field of view of first three-dimensional imaging system 30B. Lastly, a portion of illuminating light 45C is back-reflected from the target 50 as back-reflected ray 51C which is incident on the image intensifier photocathode 56 of third three-dimensional imaging system 30C and contributes to the 3D imaging process of the target 50 within the field of view of third three-dimensional imaging system 30C.

However, there are also spurious rays of light which are emitted by for example one or more of the three-dimensional imaging systems 30A and 30B and incident on the image intensifier photocathode 56 of a three-dimensional imaging system 30C, thereby corrupting the 3D imaging process of the third three-dimensional imaging system 30C. As shown in FIG. 6, second three-dimensional imaging system 30B emits illuminating light 45B into an area on the target 50 that overlaps with the field-of-view of third three-dimensional imaging system 30C. A portion of illuminating light 45B is back-reflected from the target 50 into back-reflected ray 151B which subsequently is incident on the input optics of third three-dimensional imaging system 30C. If the optical wavelength of illuminating light 45B is substantially the same as the optical wavelength of illuminating light 45C, then back-reflected ray 151B will be transmitted through the optical filter 54 of third three-dimensional imaging system 30C and is subsequently incident on the image intensifier photocathode 56 of third three-dimensional imaging system 30C and corrupts the distance measurement calculations of third three-dimensional imaging system 30C since the phase of back-reflected ray 151B will not have the correct phase since back-reflected ray 151B is associated with both a different three-dimensional imaging system as well as an optical path different than the nominal illumination and imaging optical paths of the third three-dimensional imaging system 30C.

This type of cross-talk or signal interference can occur whenever two or more three-dimensional imaging systems of examples of this technology attempt to capture 3D imagery of the same portion of the same target 50 at the same time. This situation can occur in many different ways, such as when the two or more three-dimensional imaging systems 30 are mounted onto each of two or more automobiles outfitted with the three-dimensional imaging systems 30 (for use during autonomous driving or collision avoidance) and the automobiles are driving in the same area or meet at an intersection. This situation can also occur in the field of robotics when the two or more three-dimensional imaging systems 30 are mounted onto each of two or more robots in a factory environment (for use during automated assembly or manufacturing operations, for example) and one three-dimensional imaging system's 30 illuminating light 45 overlaps with a second three-dimensional imaging system's 30 field-of-view when they both have to capture 3D imagery of the same target object, such as when the target object is being handed off from one robot to a second, or when both robots are picking parts from the same bin of parts concurrently.

One remedy to this multi-camera interference problem is to have each of the two or more three-dimensional imaging systems 30A, 30B, and 30C operate with different optical wavelengths of the illuminating light 45 (or 45A, 45B, 45C). Most LED illumination light sources 42 emit into an optical bandwidth of approximately 30 nm, which is nominally the width of the optical filter 54 as well. Since the photocathode 56 of the image intensifier 74 is responsive to a wavelength band of about 400 nm, then only about thirteen possible 30 nm-wide illumination bands of illuminating light are possible. Since there are literally millions of cars on the road, the chances of two cars having three-dimensional imaging systems 30 operating with the same emission wavelength is quite high and this is not a viable solution. However, multiple emission wavelengths across multiple three-dimensional imaging systems 30A, 30B, and 30C may be quite suitable for robotics on the factory floor where the interactions between the robots is not random and the operator can specify the wavelength of the illuminating light that each robot's three-dimensional imaging system 30 operates with.

The case of three-dimensional imaging systems 30 of examples of this technology being installed on each of several million semi-autonomous, autonomous, or driverless vehicles presents significant challenges for the multi-camera interference problem since any two of the several million three-dimensional imaging systems 30 can interfere with one another at any time or at any place. This means that no two three-dimensional imaging systems 30 can interfere because the resulting corrupt 3D imagery provided by either three-dimensional imaging system 30 can lead to a disastrous automobile accident.

A solution to the multi-camera interference problem is to have the modulation frequency of the illumination light, $f_{illum}$, of each three-dimensional imaging systems 30 be slightly different. For example, if three-dimensional imaging system 30A emits illuminating light 45A, modulated at 25,000,000 Hz, and three-dimensional imaging system 30B emits illuminating light 45B modulated at 25,001,000 Hz, then after heterodyning each three-dimensional imaging system 30 will have a 25,001,000−25,000,000=1,000 Hz interfering signal present on the fluorescent screen 62 of their respective image intensifier 74. This 1,000 Hz signal will generally be too fast for the phosphors of the fluorescent screen 62 to respond to and will average to a constant value. Even if a temporally fast phosphor is used in the fluorescent screen 62 (screen phosphors with a decay time constant down to 100 ns are commercially available) the relatively long exposure time (being 1/64 second for a 64 frames/sec operation) of the image sensor 70 will integrate the 1,000 Hz $f_{fs}$ signal to the point where the result of the integration appears like a constant value. Indeed, the frame rate of the image sensor 70 can place a limit on how close two modulation frequencies of the illuminating light 45 of two separate three-dimensional imaging systems 30 can be. For example, if the frame rate of the image sensor 70 is 64 frames/second (or 64 Hz), and if guard bands of 64 Hz width are provided on each side of the 64 Hz frame-rate frequency band, the separation between modulation frequencies must be at least 3×64 Hz=192 Hz. If this is rounded up to 200 Hz, and the modulation frequency band of the illuminating light 45 that provides adequate distance measurement accuracy is the 25 MHz band from 25 MHz to 50 MHz, then some (50,000,000−25,000,000) Hz/200 Hz=125,000 different three-dimensional imaging system frequencies that can be in operation concurrently without any multi-camera interference.

Nonetheless, 1/125,000 is not zero, meaning that sooner or later two three-dimensional imaging systems 30 (from a pool of several million) will interfere. There are even more solutions to reduce the chance of interference to zero. One solution is to have each three-dimensional imaging system 30 momentarily pause and not transmit illuminating light 45 during a period of time, and 'listen' for the reception of any emissions from any interfering three-dimensional imaging systems 30. If a three-dimensional imaging system 30A determines that no other three-dimensional imaging systems 30B or 30C in this example are transmitting illuminating light 45 then the three-dimensional imaging system 30A will transmit illuminating light 45 and proceed with its own three-dimensional image-capturing processes. The duration of a listening period can be between one microsecond and ten seconds in duration.

During a listening period the image intensifier 74 is still operating as a mixer and outputting a heterodyned signal onto fluorescent screen 62 that can be captured by the image sensor 70 and processed by the digital processing system 32 as described in connection with FIG. 1, if an interfering signal is present. If an interfering signal is received by the 'listening' three-dimensional imaging system 30A in this example (in which case the amplitude, computed in accordance with equation (24), will have a value exceeding a threshold value for at least several pixels), then the listening three-dimensional imaging system 30 can change to a different modulation frequency by changing the tuning words the first direct digital synthesizer 38 and second direct digital synthesizer 64 operate from. Once the tuning words have been changed the listening three-dimensional imaging system 30A in this example can continue to listen on the new modulation frequency, and if the listening three-dimensional imaging system 30A does not receive an interfering signal can commence three-dimensional imaging processes with the new modulation frequency.

Another solution to the multi-camera interference problem is to utilize frequency-hopping techniques. The first direct digital synthesizer 38 and second direct digital synthesizer 64 can have their tuning words changed causing both $f_{illum}$ and $f_{MCP}$ to change to a new frequency at least once per second, or preferably several hundred or even up to 100,000 times per second. This means that the modulation frequency of the illuminating light 45 and the image intensifier drive signal 67 can both change, or hop, several thousand times per second, synchronously, while maintaining the desired frequency difference ($f_{fs}$) and/or phase between them. If one of the frequencies of the frequency hopping sequence is interfered with (i.e., is close in modulation frequency) by the emissions of another three-dimensional imaging system 30, the interference will occur for only a very small fraction of a second, such as a millisecond. Since the fluorescent screen 62 of a micro-channel plate image intensifier 74 (as well as the image sensor 70 operating at tens of frames per second) is not strongly responsive to millisecond-duration events, the interference will not cause a significant error in the distance measuring process of the three-dimensional imaging system 30.

Accordingly, as illustrated and described by way of the examples herein, this technology provides a number of advantages including methods and systems that generate a modulation frequency for a 3D imaging system, in which the frequency can be quickly changed to nearly any arbitrary value and can be done without the use of an additional signal switching circuit. Additionally, this technology provides methods and systems that generate a modulation frequency for a 3D imaging system in which the phase of the modulation also can be quickly changed to any arbitrary value as well. Further, with this technology neighboring 3D imaging systems can identify and quickly utilize a non-offending modulation frequency to eliminate interference and 3D imaging process corruption.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, such as arrows in the diagrams therefore, is not intended to limit the claimed processes to any order or direction of travel of signals or other data and/or information except as may be specified in the claims. Accordingly, the invention is limited only by the following claims and equivalents thereto.

What is claimed is:

1. A three-dimensional imaging system, the system comprising:
   a plurality of frequency generators each adjustable to generate one of a plurality of modulation frequencies, wherein at least one of the frequency generators is configured to mitigate interference by changing the corresponding one of the plurality of modulation frequencies to an arbitrary one of the plurality of modulation frequencies in response to a detection of an interfering signal;
   a light emission system configured to be modulated with the one of the modulation frequencies adjustably generated by one of the plurality of generators and to output light used to illuminate a target;

an image capture system configured to be modulated by another one of the modulation frequencies adjustably generated by another one of the frequency generators to capture reflected light from the light that illuminates the target; and an image processing computing device coupled to an output of the image capture system to generate a three-dimensional image of the target based on the captured reflected light.

2. The system as set forth in claim 1 wherein each of the plurality of frequency generators is adjustable to modify a phase of at least one of the generated modulation frequencies.

3. The system as set forth in claim 1 wherein at least one of the frequency generators comprises a direct digital synthesizer circuit.

4. The system as set forth in claim 3 wherein the direct digital synthesizer circuit comprises a frequency control register, a phase accumulator, a phase-to-amplitude converter, and a digital-to-analog coupled in series.

5. The system as set forth in claim 1 wherein the at least one of the frequency generators comprises a phase lock loop circuit.

6. The system as set forth in claim 5 wherein the phase lock loop circuit comprises a divide by M logic circuit, a phase comparator, and a voltage controlled oscillator coupled in series and a divide by N logic circuit having an input coupled to an output of the voltage controlled oscillator and an output coupled to the phase comparator.

7. The system as set forth in claim 1 wherein the plurality of frequency generators are coupled to a common frequency source.

8. The system as set forth in claim 7 wherein the common frequency source comprises a crystal oscillator coupled to a master clock, the master clock coupled to the frequency generators and the image capture system.

9. The system as set forth in claim 1 wherein the light emission system further comprises a light source coupled to a light source driver, the light source driver is coupled to receive the one of the generated modulation frequencies from the one of the plurality of generators, wherein the light source driver is modulated with the one of the modulation frequencies adjustably generated by one of the plurality of generators.

10. The system as set forth in claim 1 wherein the image capture system further comprises an image intensifier and a shutter signal generator coupled to an image sensor, wherein a gain of the image intensifier and of the shutter signal generator are modulated with the one of the modulation frequencies adjustably generated by one of the plurality of generators.

11. The system as set forth in claim 1 wherein each of the plurality of frequency generators is adjustable to generate the one of the modulation frequencies and the another one of the modulation frequencies to be the same.

12. The system as set forth in claim 2 wherein each of the plurality of frequency generators is adjustable to modify the phase of at least one of the one of the modulation frequencies and the another one of the modulation frequencies when capturing the reflected light from the light that illuminates the target.

13. The system as set forth in claim 1 wherein each of the plurality of frequency generators is adjustable to generate the one of the modulation frequencies to be different from the another one of the modulation frequencies by at least one Hertz.

14. The system as set forth in claim 1 wherein each of the plurality of frequency generators is adjustable to generate the one of the modulation frequencies to have a constant difference from the another one of the modulation frequencies.

15. The system as set forth in claim 1 wherein each of the plurality of frequency generators is adjustable to change the one of the modulation frequencies and the another one of the modulation frequencies after each generation of a three-dimensional image of the target.

16. The system as set forth in claim 1 wherein each of the plurality of frequency generators is adjustable to change the one of the modulation frequencies and the another one of the modulation frequencies in response to a detection of an external light source modulated at yet another one of the modulation frequencies.

17. The system as set forth in claim 16 wherein the yet another one of the modulation frequencies differs from the one of the modulation frequencies and the another one of the modulation frequencies by less than 100 Hertz.

18. The system as set forth in claim 10 wherein the one of the modulation frequencies and the another one of the modulation frequencies and a shutter control signal are coherent.

19. The system as set forth in claim 1 wherein each of the plurality of frequency generators is adjustable to change the one of the modulation frequencies and the another one of the modulation frequencies at a rate of at least once per second.

20. A method for making a three-dimensional imaging system, the method comprising:

providing a plurality of frequency generators coupled to a common frequency source, each of the plurality of frequency generators is adjustable to generate one of a plurality of modulation frequencies, wherein at least one of the plurality of frequency generators is configured to mitigate interference by changing the corresponding one of the plurality of modulation frequencies to an arbitrary one of the plurality of modulation frequencies in response to a detection of an interfering signal;

coupling a light emission system to be modulated with the one of the modulation frequencies adjustably generated by one of the plurality of generators and to output light used to illuminate a target;

positioning an image capture system to capture reflected light from the light that illuminates the target, the image capture system coupled to be modulated by another one of the modulation frequencies adjustably generated by another one of the frequency generators; and coupling an image processing computing device to an output of the image capture system to generate a three-dimensional image of the target based on the captured reflected light.

21. The method as set forth in claim 20 wherein each of the plurality of frequency generators is adjustable to modify a phase of at least one of the generated modulation frequencies.

22. The method as set forth in claim 20 wherein at least one of the frequency generators comprises a direct digital synthesizer circuit.

23. The method as set forth in claim 22 wherein the direct digital synthesizer circuit comprises a frequency control register, a phase accumulator, a phase-to-amplitude converter, and a digital-to-analog coupled in series.

24. The method as set forth in claim 20 wherein the at least one of the frequency generators comprises a phase lock loop circuit.

25. The method as set forth in claim 24 wherein the phase lock loop circuit comprises a divide by M logic circuit, a phase comparator, and a voltage controlled oscillator coupled in series and a divide by N logic circuit having an input coupled to an output of the voltage controlled oscillator and an output coupled to the phase comparator.

26. The method as set forth in claim 20 further comprising coupling a common frequency source to the plurality of frequency generators.

27. The method as set forth in claim 26 wherein the common frequency source comprises a crystal oscillator coupled to a master clock, the master clock coupled to the frequency generators and the image capture system.

28. The method as set forth in claim 20 wherein the light emission system further comprises a light source coupled to a light source driver, the light source driver is coupled to receive the one of the generated modulation frequencies from the one of the plurality of generators, wherein the light source driver is modulated with the one of the modulation frequencies adjustably generated by one of the plurality of generators.

29. The method as set forth in claim 20 wherein the image capture system further comprises an image intensifier and a shutter signal generator coupled to an image sensor, wherein a gain of the image intensifier and of the shutter signal generator are modulated with the one of the modulation frequencies adjustably generated by one of the plurality of generators.

30. The method as set forth in claim 20 wherein each of the plurality of frequency generators is adjustable to generate the one of the modulation frequencies and the another one of the modulation frequencies to be the same.

31. The method as set forth in claim 21 wherein each of the plurality of frequency generators is adjustable to modify the phase of at least one of the one of the modulation frequencies and the another one of the modulation frequencies when capturing the reflected light from the light that illuminates the target.

32. The method as set forth in claim 20 wherein each of the plurality of frequency generators is adjustable to generate the one of the modulation frequencies to be different from the another one of the modulation frequencies by at least one Hertz.

33. The method as set forth in claim 20 wherein each of the plurality of frequency generators is adjustable to generate the one of the modulation frequencies to have a constant difference from the another one of the modulation frequencies.

34. The method as set forth in claim 20 wherein each of the plurality of frequency generators is adjustable to change the one of the modulation frequencies and the another one of the modulation frequencies after each generation of a three-dimensional image of the target.

35. The method as set forth in claim 20 wherein each of the plurality of frequency generators is adjustable to change the one of the modulation frequencies and the another one of the modulation frequencies in response to a detection of an external light source modulated at yet another one of the modulation frequencies.

36. The method as set forth in claim 35 wherein the yet another one of the modulation frequencies differs from the one of the modulation frequencies and the another one of the modulation frequencies by less than 100 Hertz.

37. The method as set forth in claim 29 wherein the one of the modulation frequencies and the another one of the modulation frequencies and a shutter control signal are coherent.

38. The method as set forth in claim 20 wherein each of the plurality of frequency generators is adjustable to change the one of the modulation frequencies and the another one of the modulation frequencies at a rate of at least once per second.

* * * * *